(12) United States Patent
Hild et al.

(10) Patent No.: US 7,099,814 B2
(45) Date of Patent: *Aug. 29, 2006

(54) I/O VELOCITY PROJECTION FOR BRIDGE ATTACHED CHANNEL

(75) Inventors: Ulrich Hild, Holzgerlingen (DE); William J. Rooney, Hopewell Junction, NY (US); Peter B. Yocom, Wappingers Falls, NY (US)

(73) Assignee: International Business Machines Corportion, Armonk, NY (US)

( * ) Notice: Subject to any disclaimer, the term of this patent is extended or adjusted under 35 U.S.C. 154(b) by 787 days.

This patent is subject to a terminal disclaimer.

(21) Appl. No.: 10/112,800

(22) Filed: Mar. 29, 2002

(65) Prior Publication Data

US 2003/0187627 A1   Oct. 2, 2003

(51) Int. Cl.
G06F 13/12 (2006.01)

(52) U.S. Cl. .............. 703/21; 710/16; 710/2; 710/15

(58) Field of Classification Search ........ 370/252, 370/362, 401; 709/226, 214; 710/10, 38; 714/43

See application file for complete search history.

(56) References Cited

U.S. PATENT DOCUMENTS

| | | | |
|---|---|---|---|
| 4,564,903 A | 1/1986 | Guyette et al. | 364/300 |
| 4,843,541 A | 6/1989 | Bean et al. | 364/200 |
| 5,317,739 A | 5/1994 | Elko et al. | 395/650 |
| 5,473,773 A | 12/1995 | Aman et al. | 395/650 |
| 5,526,484 A | 6/1996 | Casper et al. | 395/200.14 |
| 5,561,809 A | 10/1996 | Elko et al. | 395/800 |
| 5,564,040 A | 10/1996 | Kubala | 395/497.04 |
| 5,675,732 A | 10/1997 | Majeti et al. | 395/200.01 |
| 5,675,739 A * | 10/1997 | Eilert et al. | 709/226 |
| 5,701,502 A * | 12/1997 | Baker et al. | 709/201 |
| 5,706,432 A | 1/1998 | Elko et al. | 395/200.08 |
| 5,812,525 A | 9/1998 | Terslinna | 370/229 |
| 6,097,722 A | 8/2000 | Graham et al. | 370/395 |
| 6,128,302 A | 10/2000 | Kim et al. | 370/397 |
| 6,185,631 B1 * | 2/2001 | Casper et al. | 710/20 |
| 6,205,143 B1 | 3/2001 | Lemieux | 370/230 |
| 6,304,549 B1 | 10/2001 | Srinivasan et al. | 370/230 |
| 6,333,929 B1 * | 12/2001 | Drottar et al. | 370/362 |

(Continued)

FOREIGN PATENT DOCUMENTS

CA    2223118    5/1999

(Continued)

OTHER PUBLICATIONS

"Dynamic Resource Allocation for Wireless LAN Interconnect", P. A. Young et al, pp. 6.1-1 to 6.1-5, 1994 IEEE.

(Continued)

Primary Examiner—Kamini Shah
Assistant Examiner—Cuong Van Luu
(74) Attorney, Agent, or Firm—Lily Neff

(57) ABSTRACT

An impact of configuration changes on controllers is projected, in a computing environment including one or more bridge attached channels. This projection quantifies the impact for each controller affected by the change, such that it is known by a quantifiable value how much the change impacts the controller. In order to project the impact, a projected I/O velocity of the controller is determined. In making the projections, pseudo channels associated with a particular bridge attached channel are modelled as independent channels. Alternatively, a utilization metric of a bridge attached channel is determined and compared to a threshold; pseudo channels associated with the bridge attached channel are modelled as independent channels if the utilization metric is below the threshold.

31 Claims, 18 Drawing Sheets

U.S. PATENT DOCUMENTS

| | | | |
|---|---|---|---|
| 6,434,637 B1 * | 8/2002 | D'Errico | 710/38 |
| 6,470,007 B1 * | 10/2002 | Berman | 370/351 |
| 6,597,956 B1 * | 7/2003 | Aziz et al. | 700/3 |
| 6,598,092 B1 * | 7/2003 | Tomizawa et al. | 709/251 |
| 6,687,766 B1 * | 2/2004 | Casper et al. | 710/20 |
| 6,745,347 B1 * | 6/2004 | Beardsley et al. | 714/43 |
| 6,748,557 B1 * | 6/2004 | Beardsley et al. | 714/43 |
| 6,779,016 B1 * | 8/2004 | Aziz et al. | 709/201 |
| 6,832,282 B1 * | 12/2004 | Duncan et al. | 710/306 |
| 6,850,997 B1 * | 2/2005 | Rooney et al. | 710/38 |
| 6,898,202 B1 * | 5/2005 | Gallagher et al. | 370/401 |
| 6,950,438 B1 * | 9/2005 | Owen et al. | 370/409 |
| 6,963,940 B1 * | 11/2005 | Glassen et al. | 710/107 |
| 6,986,137 B1 * | 1/2006 | King et al. | 718/104 |
| 6,993,611 B1 * | 1/2006 | Ajanovic et al. | 710/107 |
| 7,007,276 B1 * | 2/2006 | Kubala et al. | 718/104 |
| 2002/0007407 A1 * | 1/2002 | Klein | 709/225 |
| 2002/0051445 A1 * | 5/2002 | Drottar et al. | 370/362 |
| 2002/0083240 A1 * | 6/2002 | Hoese et al. | 710/74 |
| 2002/0196741 A1 * | 12/2002 | Jaramillo et al. | 370/252 |
| 2002/0196773 A1 * | 12/2002 | Berman | 370/351 |
| 2003/0095549 A1 * | 5/2003 | Berman | 370/392 |
| 2003/0105829 A1 * | 6/2003 | Hayward | 709/214 |
| 2003/0126265 A1 * | 7/2003 | Aziz et al. | 709/227 |
| 2003/0191793 A1 * | 10/2003 | Dolin et al. | 709/103 |
| 2004/0054838 A1 * | 3/2004 | Hoese et al. | 710/305 |
| 2004/0093455 A1 * | 5/2004 | Duncan et al. | 710/310 |
| 2004/0162921 A1 * | 8/2004 | Teow et al. | 710/10 |
| 2005/0033916 A1 * | 2/2005 | Dellacona | 711/114 |
| 2005/0083853 A1 * | 4/2005 | Rooney et al. | 370/252 |
| 2005/0165868 A1 * | 7/2005 | Prakesh | 707/204 |
| 2005/0172093 A1 * | 8/2005 | Jain | 711/162 |
| 2005/0193059 A1 * | 9/2005 | Dellacona | 709/203 |
| 2005/0283560 A1 * | 12/2005 | Hoese et al. | 710/305 |

FOREIGN PATENT DOCUMENTS

| | | |
|---|---|---|
| EP | 1001574 A1 | 5/2000 |
| EP | 1102149 A2 | 5/2001 |
| WO | WO 97/03189 | 1/1997 |
| WO | WO 98/27692 | 6/1998 |

OTHER PUBLICATIONS

"The Impact of the Web on Networking Research", P. Green, 3 pages, ACM Computing Surveys, Dec. 1996.

"Bandwidth Management for AAL2 Traffic" by H. Saito, IEEE Transactions on Vehicular Technology, vol. 49, No. 4, Jul. 2000, pp. 1364-1377.

"IBM z/OS: An Operating System Solution for the Future of Your Business", Software Announcement Oct. 3, 2000, 22 pages.

IBM ESCON Director 9032-5 Presentation by K. Trowell et al, SG24-2005-00, Sep. 1999 pp. 69-84k.

Introduction to IBM S/390 FICON by K. Trowell et al, SG24-5176-00, Oct. 1999, 53 pages.

Pending U.S. Appl. No. 09/676,715, filed Sep. 29, 2000, "Method, System and Program Products for Projecting the Impact of Configuration Changes on Controllers", by Johnson et al.

Pending U.S. Appl. No. 09/539,024, filed Mar. 30, 2000, "Measuring Utilization of Individual Components of Channels", by S. G. Glassen et al.

Pending U.S. Appl. No. 09/407,544, filed Sep. 28, 1999, "Method, System and Program Products For Managing I/O Configurations Of A Computing Environment" by R. Cwiakala et al.

Pending U.S. Appl. No. 09/407,514, filed Sep. 28, 1999, "Method and Apparatus For Creating And Identifying Logical Partition Clusters" by W. J. Rooney et al.

Pending U.S. Appl. No. 09/407,810, filed Sep. 28, 1999, "Method and Apparatus For Assigning Resources To Logical Partition Clusters", by W. J. Rooney et al.

Pending U.S. Appl. No. 09/407,453, filed Sep. 28, 1999, "Method System and Program Products For Determining I/O Configuration Entropy", by W. J. Rooney.

Pending U.S. Appl. No. 09/407,459, filed Sep. 28, 1999, "Processing Channel Subsystem Pending I/O Work Queues Based On Priorities" by Maergner et al.

Pending U.S. Appl. No. 09/407,594, filed Sep. 28, 1999, "Method, System and Program Products For Managing Logical Processors Of A Computing Environment" by G. M. King et al.

Pending U.S. Appl. No. 09/407,212, filed Sep. 28, 1999 "Method, System and Program Products For Managing Central Processing Unit Resources Of A Computing Environment" by C. K. Eilert et al.

Pending U.S. Appl. No. 09/407,391, filed Sep. 28, 1999, "Method, System and Program Products For Managing Groups of Partitions Of A Computing Environment", by J. P. Kubala et al.

Pending U.S. Appl. No. 09/408,470, filed Sep. 28, 1999, "Dynamically Redistributing Shareable Resources Of A Computing Environment To Manage The Workload Of That Environment" by J. P. Kubala et al.

Pending U.S. Appl. No. 09/676,714, filed Sep. 29, 2000, "Method, System and Program Products For Determining Whether I/O Constraints Exist For Controllers Of A Computing Environment" by W. J. Rooney et al.

The Following Manuals, Which are Referenced in the Application, are Being Obtained—These Manuals Will be Filed in the US PTO When Applicant Receives Them.

Z/Architecture Principles of Operation, IBM Publication No. SA22-7832-00, Dec. 2000.

Processor Resource/Systems Manager Planning Guide, No. GA22-7236-04, Mar. 1999.

Introducing Enterprise Systems Connection, No. GA23-0383-01, Sep. 1991.

Enterprise Systems Connection (ESCON) Implementation Guide, No. SG24-4662-00, Jul 1996.

Programming the Interface for Enterprise Systems Connection Directors—with FICON Converter Feature, No. SA23-0356-06, Sep. 1999.

Planning for the 9032 Model 5 Director with FICON Converter Feature, No. SA22-7415-01, Aug. 1999.

\* cited by examiner

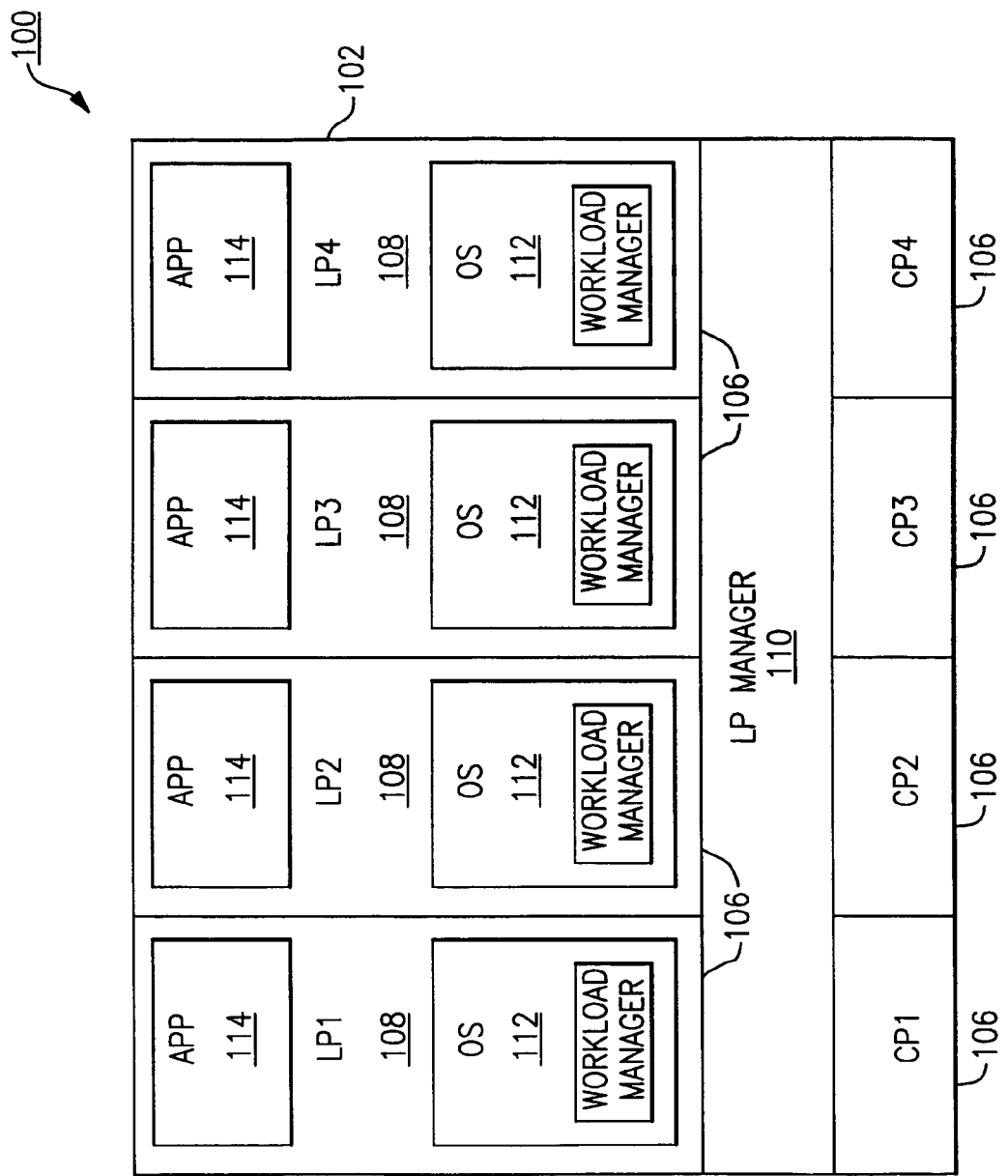

COUPLING FACILITY

| GLOBAL DATA (CONTINUED) |
|---|
| PSEUDO CHPID CONNECT TIME (INTERVAL 1, INDEX 1) |
| PSEUDO CHPID CONNECT TIME (INTERVAL 2, INDEX 1) |
| PSEUDO CHPID CONNECT TIME (INTERVAL 3, INDEX 1) |
| PSEUDO CHPID CONNECT TIME (INTERVAL 4, INDEX 1) |
| AVERAGE OF PSEUDO CHPID CONNECT TIME INTERVALS (INDEX 1) |
| PSEUDO CHPID CONNECT TIME (INTERVAL 1, INDEX 2) |
| PSEUDO CHPID CONNECT TIME (INTERVAL 2, INDEX 2) |
| PSEUDO CHPID CONNECT TIME (INTERVAL 3, INDEX 2) |
| PSEUDO CHPID CONNECT TIME (INTERVAL 4, INDEX 2) |
| AVERAGE OF PSEUDO CHPID CONNECT TIME INTERVALS (INDEX 2) |
| . . . |
| PSEUDO CHPID CONNECT TIME (INTERVAL 1, INDEX 8) |
| PSEUDO CHPID CONNECT TIME (INTERVAL 2, INDEX 8) |
| PSEUDO CHPID CONNECT TIME (INTERVAL 3, INDEX 8) |
| PSEUDO CHPID CONNECT TIME (INTERVAL 4, INDEX 8) |
| AVERAGE OF PSEUDO CHPID CONNECT TIME INTERVALS (INDEX 8) |

FIG.5B

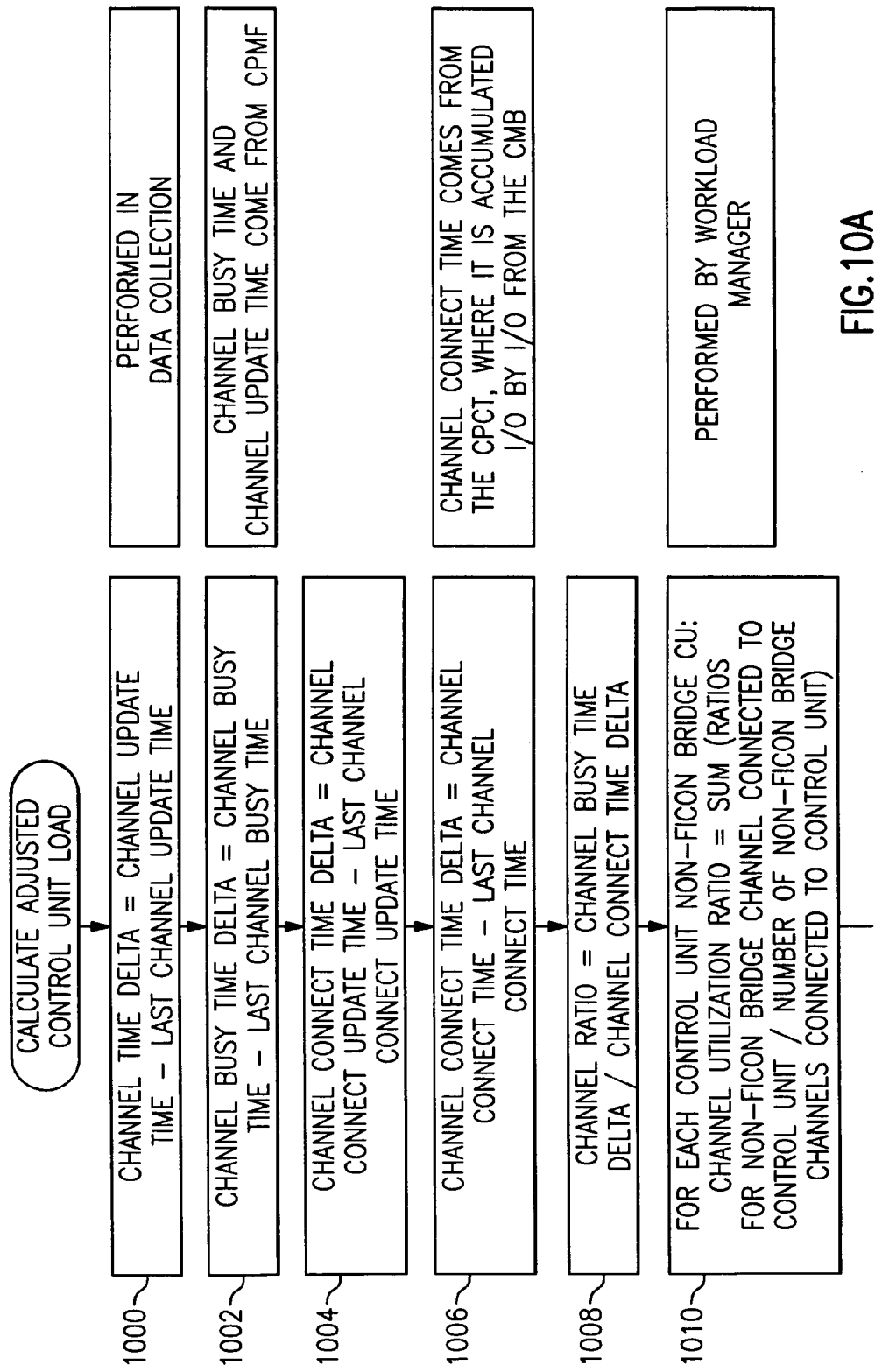

I/O VELOCITY PROJECTION FOR BRIDGE ATTACHED CHANNEL

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"Method, System And Program Products For Determining Whether I/O Constraints Exist For Controllers Of A Computing Environment," Rooney et al., Ser. No. 09/676,714, filed Sep. 29, 2000;

"Dynamically Redistributing Shareable Resources Of A Computing Environment To Manage The Workload Of That Environment," Kubala et al., Ser. No. 09/408,470, filed Sep. 28, 1999;

"Method, System And Program Products For Managing Groups Of Partitions Of A Computing Environment," Kubala et al., Ser. No. 09/407,391, filed Sep. 28, 1999;

"Method, System And Program Products For Managing Central Processing Unit Resources Of A Computing Environment," Eilert et al., Ser. No. 09/407,212, filed Sep. 28, 1999;

"Method, System And Program Products For Managing Logical Processors Of A Computing Environment," King et al., Ser. No. 09/407,594, filed Sep. 28, 1999;

"Processing Channel Subsystem Pending I/O Work Queues Based On Priorities," Maergner et al., Ser. No. 09/407,459, filed Sep. 28, 1999;

"Method, System And Program Products For Determining I/O Configuration Entropy," William J. Rooney, Ser. No. 09/407,453, filed Sep. 28, 1999;

"Method And Apparatus For Assigning Resources To Logical Partition Clusters," Rooney et al., Ser. No. 09/407,810, filed Sep. 28, 1999;

"Method And Apparatus For Creating And Identifying Logical Partition Clusters," Rooney et al., Ser. No. 09/407,514, filed Sep. 28, 1999;

"Method, System and Program Products For Managing I/O Configurations Of A Computing Environment," Cwiakala et al., Ser. No. 09/407,544, filed Sep. 28, 1999;

"Measuring Utilization Of Individual Components Of Channels," Glassen et al., Ser. No. 09/539,024, filed Mar. 30, 2000; and "Method, System and Program Products for Projecting the Impact of Configuration Changes on Controllers," Johnson et al., Ser. No. 09/676,715, filed Sep. 29, 2000.

TECHNICAL FIELD

This invention relates, in general, to input/output (I/O) processing, and in particular, to projecting the impact of configuration changes on controllers in configurations involving one or more bridge attached channels.

BACKGROUND

The management of workload plays an important role in computing environments today. Thus, various aspects of processing within a computing environment are scrutinized to ensure a proper allocation of resources and to determine whether any constraints exist. One type of processing that is scrutinized is I/O processing.

In I/O processing, workload management includes properly allocating different kinds of channels to control units. To determine whether the allocation is sufficient, channel delay is measured. Previously, the metric of channel delay included measuring the response times. In application Ser. No. 09/676,715, "Method, System and Program Products for Projecting the Impact of Configuration Changes on Controllers," Johnson et al., previously incorporated herein by reference, the metric used is channel pending time.

When it is determined that the allocation is insufficient, then various changes need to be made. The cost of making these changes is expensive and thus, a need exists for a technique for projecting the impact of configuration changes on the control units, prior to making the adjustments. In particular, a need exists for a capability that quantifies the impact of a change on one or more control units to be affected by that change.

Furthermore, I/O configurations exist where one or more channels are connected, either directly or indirectly, to a bridge device. Such a channel is referred to as being bridge attached. A bridge device may perform either or both of the following functions. First, a bridge device may perform protocol conversion, allowing a device using one protocol to communicate with a device using a different protocol. Second, a bridge device may perform capacity matching, providing a mechanism for communicating the information from two or more low capacity links over a single high capacity link. In computing environments having one or more bridge attached channels, a further need exists for projecting the impact of configuration changes which takes into account the capabilities of bridge attached channels.

SUMMARY OF THE INVENTION

The shortcomings of the prior art are overcome and additional advantages are provided through the provision of a method of projecting an impact of configuration changes on controllers in computing environments having one or more bridge attached channels. The method includes, for instance, associating a plurality of pseudo-channels with a bridge attached channel, selecting a controller associated with a configuration change, and projecting an impact of the configuration change, wherein the projecting includes modeling the plurality of pseudo-channels as a plurality of independent channels, and quantifying the impact.

In another embodiment, a method of projecting an impact of configuration changes on controllers in computing environments having one or more bridge attached channels is provided, wherein either the bridge attached channel or a pseudo-channel may be capacity limited. The method includes, for instance, associating a plurality of pseudo-channels with a bridge attached channel, determining a utilization metric of the bridge attached channel, selecting a controller associated with a configuration change, and projecting an impact of the configuration change, wherein the projecting includes modeling the plurality of pseudo-channels as a plurality of independent channels if the utilization metric is below a threshold, and quantifying the impact.

System and computer program products corresponding to the above-summarized methods are also described and claimed herein.

Advantageously, a capability is provided for quantifying the impact of configuration changes on controllers in computing environments having one or more bridge attached channels. The quantification provides numerical representations of the impact that a particular change has one or more controllers associated with the change, taking into account the capabilities of bridge attached channels. These representations can be used to select a best option for making a configuration change.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A depicts one example of a computing environment incorporating and using one or more aspects of the present invention;

FIGS. 5A–5C depict one embodiment of a global data structure located within a coupling facility used to store the collected data, in accordance with an aspect of the present invention;

BEST MODE FOR CARRYING OUT THE INVENTION

Figure 1B:
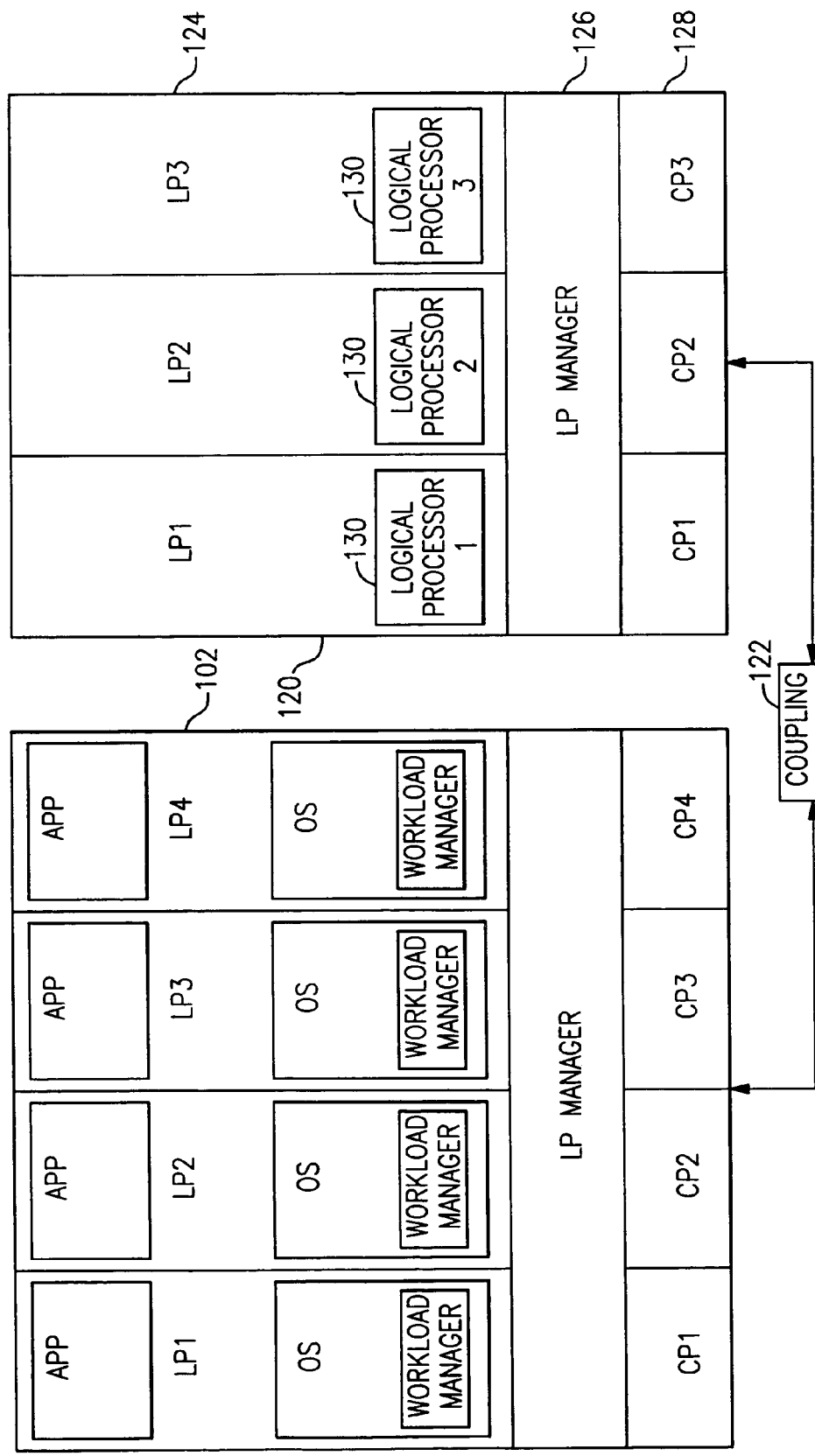
FIG. 1B depicts another embodiment of a computing environment incorporating and using one or more aspects of the present invention.

In accordance with an aspect of the present invention, a capability is provided for determining whether a controller (e.g., a control unit) within a computing environment including one or more bridge attached channels needs additional resources, such as input/output (I/O) resources (e.g., one or more channels or pseudo-channels). In making this determination, a metric representing the resource is calculated (I/O velocity). A plurality of pseudo-channels are associated with each bridge attached channel. Pseudo-channels are defined herein, with reference to FIG. 2. In one embodiment of the present invention, each pseudo-channel associated with an individual bridge attached channel is modeled as an independent channel when determining the impact of a configuration change.

In accordance with another aspect of the present invention, a utilization metric of the bridge attached channel is determined. If, during any particular adjustment interval, the utilization metric exceeds a threshold, the pseudo-channels associated with this bridge attached channel are no longer modeled as independent channels. The threshold value may be adjusted over time to reflect changing system parameters. Furthermore, the utilization metric may be determined periodically, since changing system parameters may cause the utilization metric of any particular bridge attached channel to fluctuate above and below a threshold.

One embodiment of a computing environment incorporating and using one or more aspects of the present invention is described with reference to FIG. 1a. A computing environment 100 is based, for instance, on the Enterprise Systems Architecture (ESA)/390 offered by International Business Machines Corporation, Armonk, N.Y. ESA/390 is described in an IBM publication entitled *z/Architecture Principles Of Operation*, IBM Publication No. SA22-7832-00, December 2000, which is hereby incorporated herein by reference in its entirety. One example of a computing environment based on z/Architecture is the~zSeries 900 offered by International Business Machines Corporation.

Computing environment 100 includes, for example, a central processor complex (CPC) 102 having one or more central processors 106 (e.g., CP1–CP4), one or more partitions 108 (e.g., logical partitions (LP1–LP4)), and at least one logical partition manager 110, each of which is described below.

Central processors 106 are physical processor resources that are allocated to the logical partitions. In particular, each logical partition 108 has one or more logical processors (not separately shown for clarity), each of which represents all or a share of a physical processor 106 allocated to the partition. The logical processors of a particular partition 108 may be either dedicated to the partition (so that the underlying processor resource 106 is reserved for that partition) or shared with another partition (so that the underlying processor resource is potentially available to another partition).

In the particular example shown, each of logical partitions LP1–LP4 functions as a separate system having a resident operating system 112 (which may differ for each logical partition) and one or more applications 114. In one embodiment, operating system 112 is the z/OS™ operating system offered by International Business Machines Corporation.

Additionally, each operating system (or a subset thereof) includes a workload manager 116 for managing the workload within a partition and among partitions. One example of a workload manager is WLM offered by International Business Machines Corporation. WLM is described in, for instance, U.S. Pat. No. 5,473,773, Aman et al., entitled "Apparatus And Method For Managing A Data Processing System Workload According To Two Or More Distinct Processing Goals", issued Dec. 5, 1995; and U.S. Pat. No. 5,675,739, Eilert et al., entitled "Apparatus And Method For Managing A Distributed Data Processing System Workload According To A Plurality Of Distinct Processing Goal Types", issued Oct. 7, 1997, each of which is hereby incorporated herein by reference in its entirety.

Logical partitions 108 are managed by logical partition manager 110 implemented by microcode running on processors 106. Logical partitions 108 (LP1–LP4) and logical partition manager 110 each comprise one or more programs residing in respective portions of central storage associated with the central processors. One example of logical partition manager 110 is the Processor Resource/Systems Manager™ (PR/SM™), which is described, for instance, in the IBM publication *Processor Resource/Systems Manager Planning Guide*, GA22-7236-04, March 1999, which is hereby incorporated herein by reference in its entirety.

Examples of logically partitioned computing systems are described in, for instance, Guyette et al., U.S. Pat. No. 4,564,903, entitled "Partitioned Multiprocessor Programming System", issued on Jan. 14, 1986; Bean et al., U.S. Pat. No. 4,843,541, entitled "Logical Resource Partitioning Of A Data Processing System", issued on Jun. 27, 1989; and Kubala, U.S. Pat. No. 5,564,040, entitled "Method And Apparatus For Providing A Server Function In A Logically Partitioned Hardware Machine", issued on Oct. 08, 1996, each of which is hereby incorporated herein by reference in its entirety.

In a further embodiment of a computing environment, two or more central processor complexes are coupled to one another to form a sysplex, as depicted in FIG. 1b. As one example, a central processor complex (CPC) 102 is coupled to one or more other CPCs 120 via, for instance, a coupling facility 122.

In the example shown, CPC 120 includes a plurality of logical partitions 124 (e.g., LP1–LP3), which are managed by a logical partition manager 126. One or more of the logical partitions include an operating system, which may have a workload manager and one or more application programs (not shown in this example for clarity). Additionally, CPC 120 includes a plurality of central processors 128 (e.g., CP1–CP3), the resources of which are allocated among the plurality of logical partitions. In particular, the resources are allocated among one or more logical processors 130 of each partition. (In other embodiments, each CPC may have one or more logical partitions and one or more central processors.)

Coupling facility 122 (a.k.a., a structured external storage (SES) processor) contains storage accessible by the central processor complexes and performs operations requested by programs in the CPCs. (In one embodiment, each central processor complex is coupled to a plurality of coupling facilities.) Aspects of the operation of a coupling facility are described in detail in such references as Elko et al., U.S. Pat. No. 5,317,739 entitled "Method And Apparatus For Coupling Data Processing Systems", issued May 31, 1994; Elko et al., U.S. Pat. No. 5,561,809, entitled "In A Multiprocessing System Having A Coupling Facility Communicating Messages Between The Processors And The Coupling Facility In Either A Synchronous Operation Or An Asynchronous Operation", issued Oct. 1, 1996; Elko et al., U.S. Pat. No. 5,706,432, entitled "Mechanism For Receiving Messages At A Coupling Facility", issued Jan. 6, 1998; and the patents and applications referred to therein, all of which are hereby incorporated herein by reference in their entirety.

In one embodiment, one or more of the central processors are coupled to at least one channel subsystem, which is used in communicating with I/O devices. For example, a central processor 200 (FIG. 2) is coupled to main storage 202 and at least one channel subsystem 204. Channel subsystem 204 is further coupled to one or more control units 206 involving one or more channels or host adapters (210, 211). Control units (206B) may be further subdivided into logical control units (218) or logical subsystems. Channels may support different I/O protocols, such as ESCON® protocol (Enterprise Systems Connection Architecture®), FICON™ protocol (Fibre Connection), FICON bridge protocol, or yet other protocols. ESCON protocol is described, for example, in the IBM publications *Introducing Enterprise Systems Connection*, GA23-0383-01, September 1991, and *Enterprise Systems Connection (ESCON) Implementation Guide*, SG24-4662-00, July 1996, each of which is hereby incorporated herein by reference in its entirety. FICON and FICON bridge protocols are described, for example, in the IBM publications *Introduction to IBM S/390 FICON*, SG24-5176-00, October 1999, and *Programming the Interface for Enterprise Systems Connection Directors—with FICON Converter Feature*, SA23-0356-06, September 1999, each of which is hereby incorporated herein by reference in its entirety. Preferred embodiments of the present invention may include one or more ESCON channels, such as channel 210, and may further include one or more FICON channels, such as channel 211. The control units are then coupled to one or more I/O devices 208. Further details regarding channel subsystems are described in Casper et al., U.S. Pat. No. 5,526,484, entitled "Method And System For Pipelining The Processing Of Channel Command Words," issued on Jun. 11, 1996; and Glassen et al., Ser. No. 09/539,024, entitled "Measuring Utilization Of Individual Components Of Channels," filed Mar. 30, 2000, each of which is hereby incorporated herein by reference in its entirety.

The channel subsystem directs the flow of information between the input/output devices and main storage. It relieves the central processing units of the task of communicating directly with the input/output devices and permits data processing to proceed concurrently with input/output processing. The channel subsystem uses one or more channel paths 214 as communication links in managing the flow of information to or from input/output devices 208.

Each channel path 214 includes, for instance, a channel 210 or 211 of channel subsystem 204, a control unit 206 and a link 212 or 213 between the channel and control unit. Links are often matched to the type of channel; for example, in preferred embodiments of the present invention, ESCON links (212) are used with ESCON channels (210), and FICON links (213) are used with FICON channels (211). In other embodiments, a channel path may have multiple channels, control units, and/or links.

Figure 2:
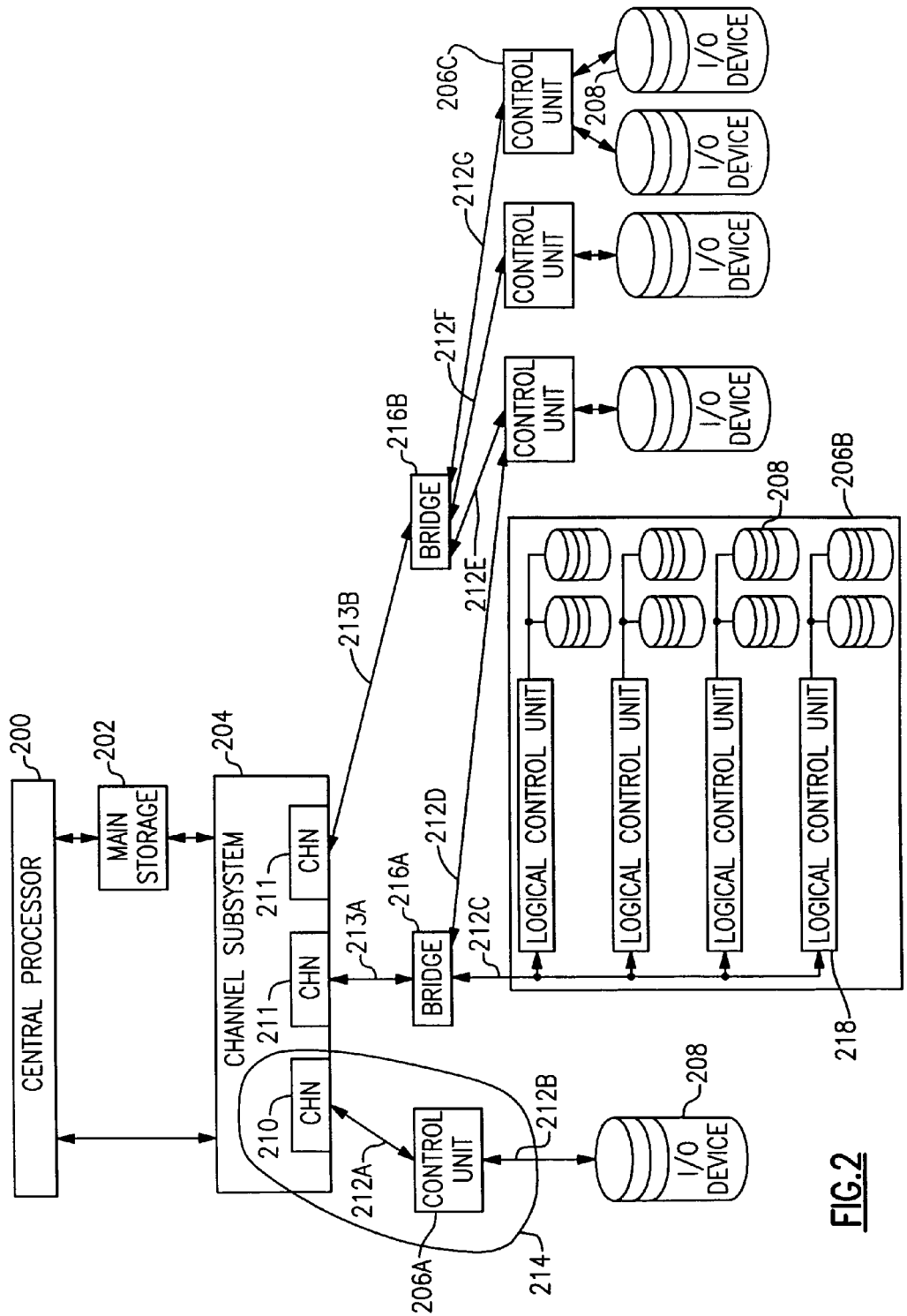
FIG. 2 depicts additional components of the computing environments of FIGS. 1A and 1B incorporating and using aspects of the present invention.

It is often desirable when introducing new I/O protocols, to provide a way for a customer to upgrade certain components of the computer system, such as the server, with new technology channels, without requiring that the customer at the same time replace all of their attached I/O devices. For this purpose, bridge devices (216) are often provided, which allow customers to connect devices using different protocols to one another. For example, a bridge device might provide the ability to connect an existing I/O device using an older protocol, to a newer channel using a new protocol. As shown in FIG. 2, one may have a bridge (216A) with one type of link on one side (213A), and another type of link on the other side (212C). In particular, in preferred embodiments of the present invention, bridge device 216 is a FICON bridge, capable of connecting to one FICON link such as 213A, and one or more ESCON links such as 212C and 212D. Since FICON channel 211 communicates with a bridge device 216, such as a FICON bridge, channel 211 is referred to as a bridge attached channel. In particular, when channel 211 is a FICON channel and bridge 216 is a FICON bridge, channel 211 is referred to as a FICON bridge channel. Use of a bridge device such as bridge 216 allows a customer to migrate at their own rate, allowing them to invest in new technology, while at the same time protecting their current investment.

When new I/O protocols and technology are introduced, it is often the case that the new technology will have a higher speed or greater capacity than the older technology. In particular, in preferred embodiments using ESCON and FICON bridge protocols, the FICON bridge channel (211) and FICON link (213) have a greater capacity than the ESCON link (212) and ESCON channel 210. Therefore, a link such as 213B may be able to sustain high data transfer rates for more than one ESCON link (212E, 212F and 212G) without the FICON link becoming a bottleneck. Eventually, if additional control units are added to bridge 216B, the channel (211) and link (213B) may be unable to sustain high data rates on the ESCON links (212E/F/G); under these circumstances, the FICON bridge channel becomes the bottleneck. In other cases, a control unit (206B) may be the only control unit connected to a bridge (216A), however if additional logical control units (218) are added to its link (212C), the ESCON link will become the limiting factor, even though the FICON bridge channel (211) and link (213A) have excess capacity.

In order to address the issue of predicting where a bottleneck may occur in a proposed configuration change, where the computing environment includes one or more bridge attached channels, this invention introduces the concept of a pseudo-channel. A pseudo-channel is defined as the logical path from a control unit port through a bridge device to a channel. A single bridge attached channel may, at any point in time, be associated with a plurality of logical paths or pseudo-channels. With reference to FIG. 2, a pseudo-channel is, for example, the path from a channel (211) through a link (213) to a bridge (216), and from the bridge to a single control unit interface via a link (212). When a bridge 216 is capable of communicating between two links having different capacities, the bridge device may be able to support more than one connection of the lower capacity protocol type. For example, three pseudo-channels are associated with bridge 216B: channel 211, to link 213B, to bridge 216B, through link 212E to a control unit; a second from channel 211, to link 213B, to bridge 216B, through link 212F to a control unit; and a third involving link 212G. Portions of the physical path, such as link 213B and its corresponding bridge attached channel 211, are capable of simultaneously supporting multiple pseudo-channels, or multiple logical paths.

As another example, two pseudo-channels are associated with bridge 216A: one from channel 211, to link 213A, to bridge 216A, through link 212C to a control unit 206B; and another from channel 211, to link 213A, to bridge 216A, through link 212D to a control unit 206. Note that although control unit 206B contains four logical control units 218, it is considered connected to a single pseudo-channel since all of the logical control units are connected to the channel via the same link (212C) and port.

Figure 12:
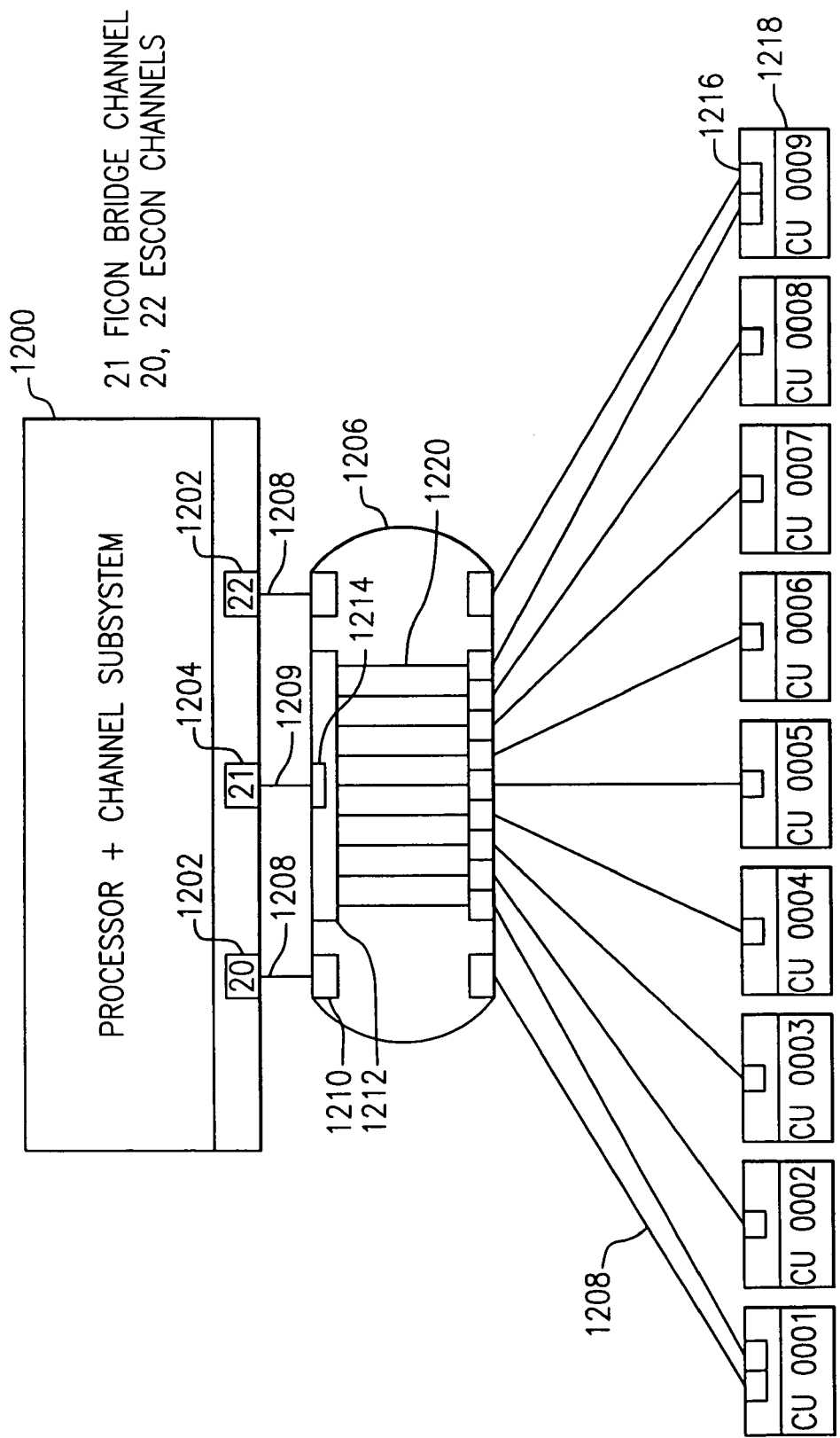
FIG. 12 depicts additional components of the computing environments of FIGS. 1A, 1B and 2 incorporating and using aspects of the present invention.

Further, referring to FIG. 12, we have a processor which in the preferred implementation includes a channel subsystem (1200). The processor contains one or more channels, some of which may be ESCON channels (1202), and others which may be FICON bridge channels (1204). Other channel protocols may be used, and are considered within the spirit and scope of the present invention. The channels are in turn connected to a dynamic switch (1206) via links; ESCON channels to ESCON links (1208) and FICON bridge channels to FICON links (1209). One example of a dynamic switch (1206) is the IBM ESCON Director, which is described, for example, in IBM publications *IBM ESCON Director* 9032-5 *Presentation*, SG24-2005-00, September 1999, and *Planning for the* 9032 *Model* 5 *Director with FICON Converter Feature*, SA22-7415-01, August 1999, each of which is hereby incorporated herein by reference in its entirety. The ESCON channels connect to ESCON ports (1210), while FICON bridge channels connect to ports (1214) in the FICON bridge card (1212). Each port to which a channel is connected, either ESCON or FICON bridge may be internally connected (1220) within switch (1206) to one or more other ESCON ports (1210) in the same switch, these ports are then connected via other links (1208) to ports (or interfaces) (1216) in control units (1218). As shown in FIG. 12, nine pseudo-channels are associated with FICON bridge channel (1204), one for each of the nine control units shown.

The number of resources (e.g., channels) that are available for use by a controller (e.g., a control unit) can be dynamically adjusted to address changing requirements of the workload. In order to determine what adjustments are to be made, a metric of resource delay is employed. In one example, this metric is referred to as I/O velocity. The I/O velocity indicates, for instance, channel delay. It can be used, in one example, to determine whether a constraint (e.g., of communications bandwidth, such as channel bandwidth) exists on a controller (e.g., a control unit (CU)). Further details regarding I/O velocity and its use in projecting the impact of proposed configuration changes are described in the aforementioned Rooney et al., application Ser. No. 09/676,714, "Method, System And Program Products For Determining Whether I/O Constraints Exist For Controllers Of A Computing Environment," and Johnson et al., application Ser. No. 09/676,715, entitled "Method, System and Program Products for projecting the impact of configuration changes on controllers,"; each of which has been incorporated herein by reference in its entirety.

In application Ser. No. 09/676,714, a method for determining whether I/O constraints exist for controllers of a computing environment is discussed. In this invention, an actual I/O velocity of a control unit is calculated using the following equation: [Control Unit I/O Velocity=ΣDevice Connect Times/(ΣDevice Connect Times+Σ(Pending Times−(CU Busy Times+Device Busy Times)))], in which each device connect time reflects the amount of time that a channel of the control unit is actually being used; and the pending time indicates the time the control unit is waiting to use the channel because all of the channels the control unit has access to (e.g., up to 8 channels) are busy. The pending time includes a number of other busy indicators, including for instance, control unit busy and device busy, which are removed from the pending time, in this embodiment.

Figure 3:
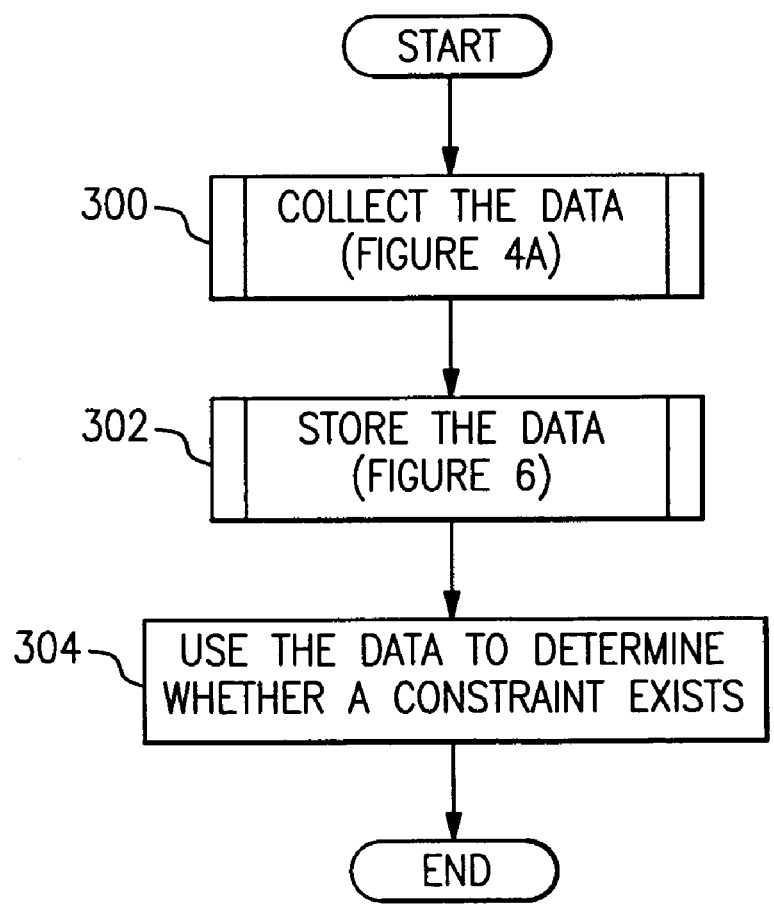
FIG. 3 depicts one embodiment of the overall logic associated with determining controller I/O velocity and using the controller I/O velocity to determine whether a controller constraint exists, in accordance with an aspect of the present invention.
Figure 5A:
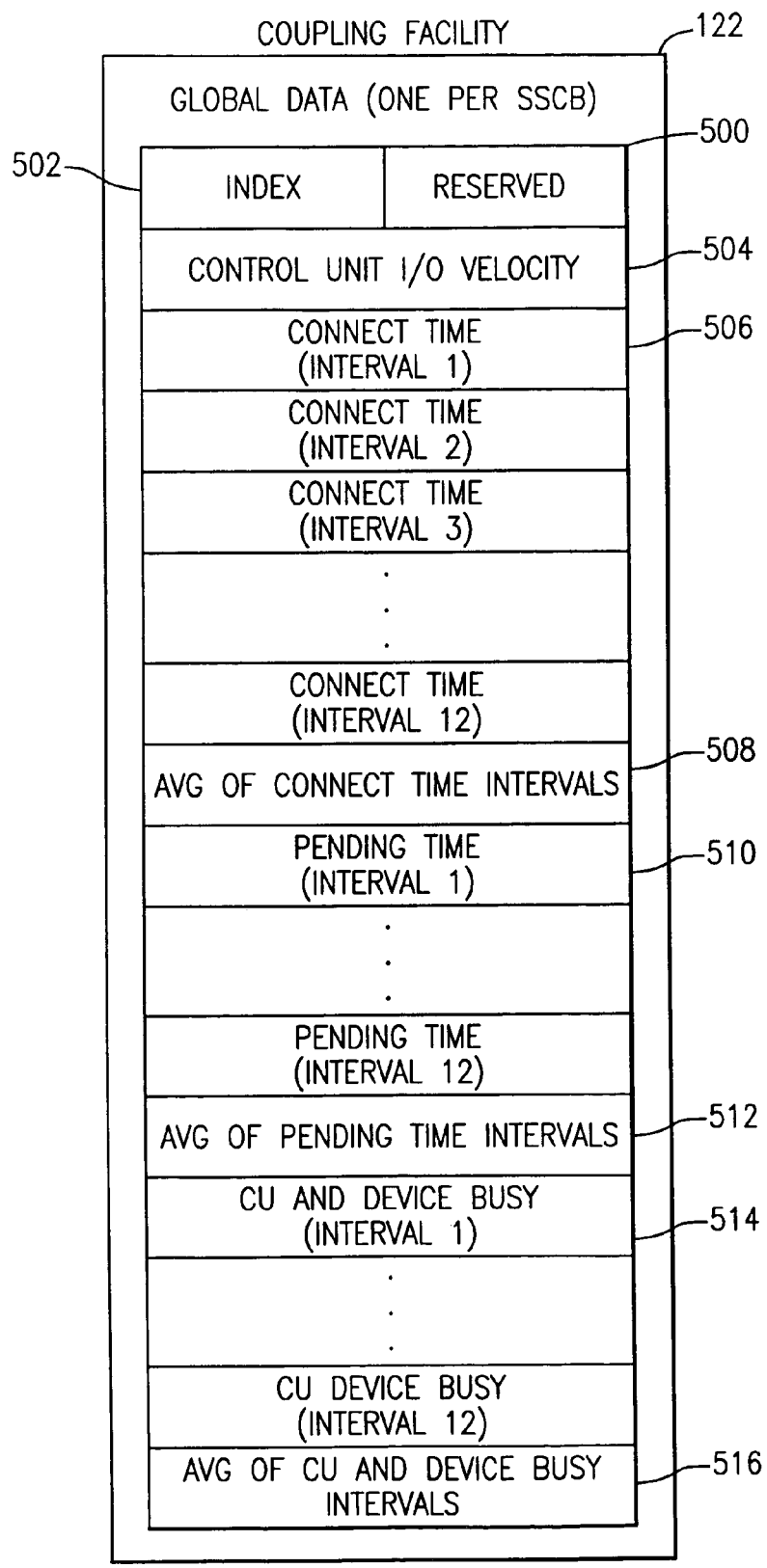
Figure 5C:
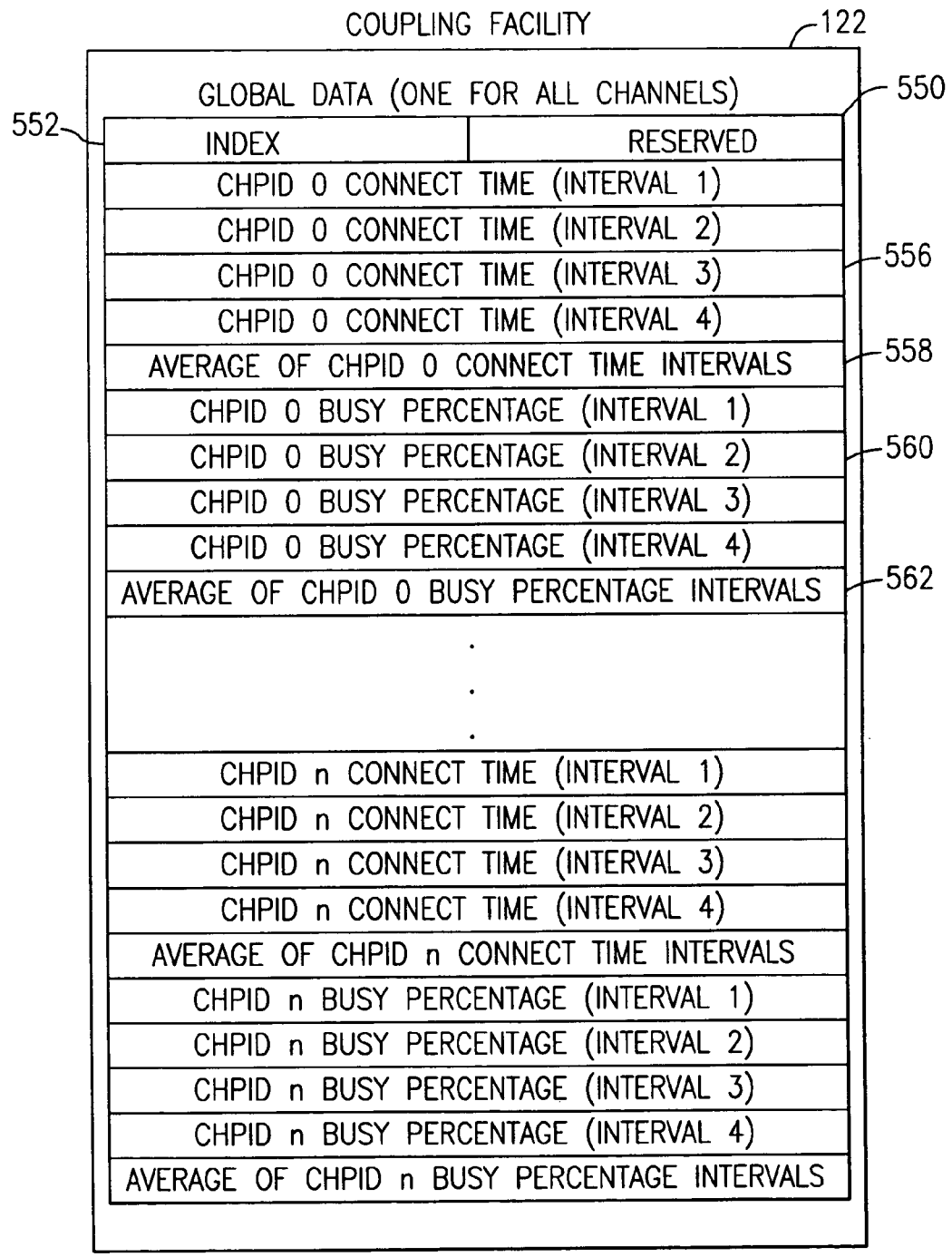
Figure 6:
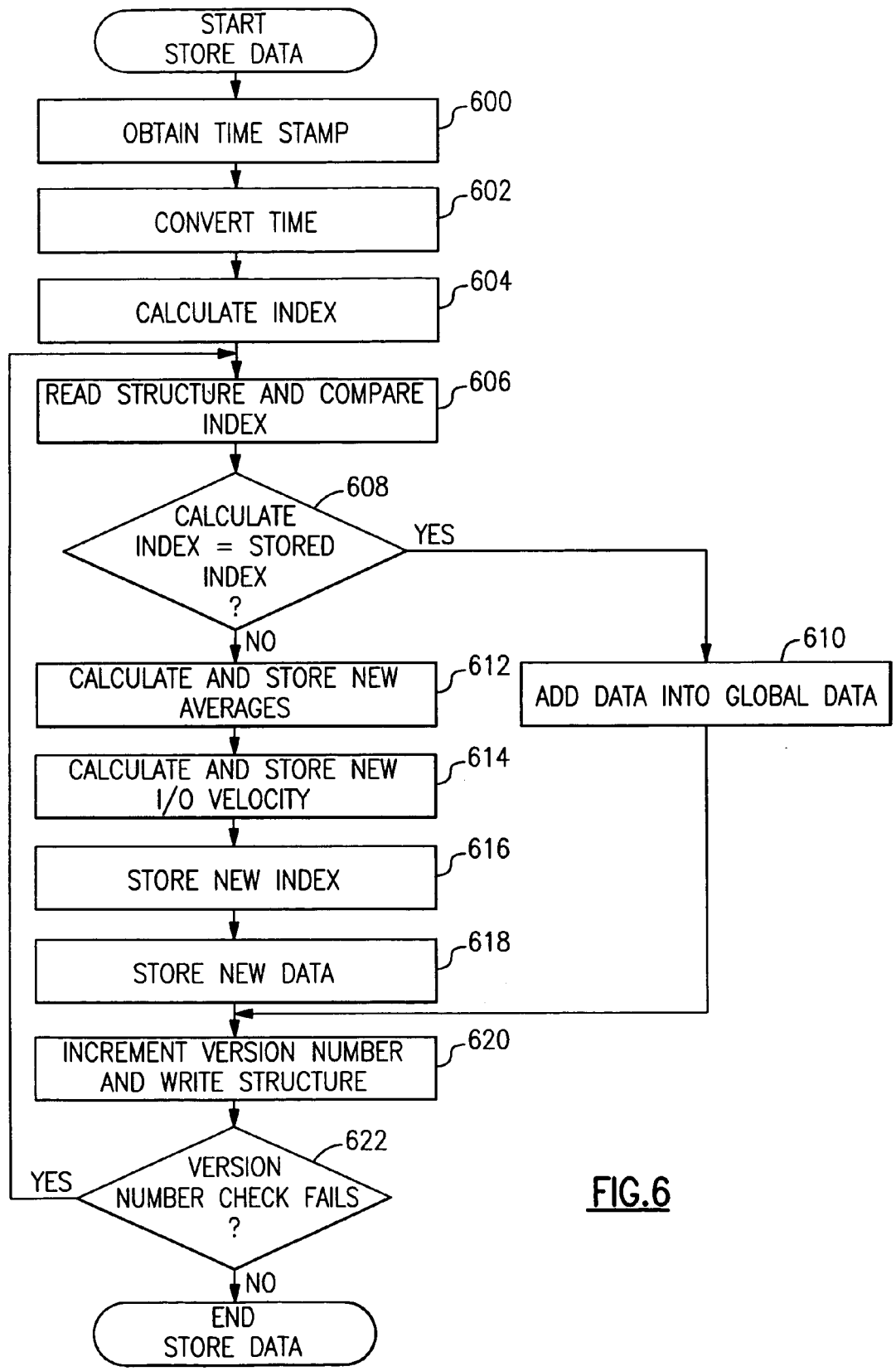
FIG. 6 depicts one embodiment of the logic associated with the storing of data of FIG. 3 and with calculating an actual I/O velocity, in accordance with an aspect of the present invention.

The various components of the control unit I/O velocity equation and use of the control unit I/O velocity are described in further detail with reference to FIGS. 3–6. In particular, FIG. 3 depicts an overview of the steps performed to determine whether a constraint on a controller exists, and FIGS. 4–6 provide additional details for those steps.

The I/O Velocity provides a capability for accurately determining delay associated with a resource, such as channel delay. Further, this information can be used to determine whether a constraint exists within the computing environment.

A method for projecting the impact of configuration changes on controllers is described in application Ser. No. 09/676,715, which has been incorporated herein by reference in its entirety. The methods of application Ser. No. 09/676,715 are most advantageously employed in computing environments which do not include bridge attached channels. While these methods may be applied in computing environments which include one or more bridge attached channels, it is demonstrated herein that alternative methods may be employed which more fully utilize the capabilities of bridge attached channels.

For example, in preferred embodiments including a FICON bridge channel in communication with a number of ESCON controllers through a FICON bridge, the FICON bridge is capable of supporting up to 8 open connections at any time. Furthermore, the capacity of a FICON bridge channel is approximately 5 times that of an ESCON link. A single FICON bridge channel is, therefore, capable of simultaneously supporting multiple ESCON pseudo-channels. Other protocols and bridge devices may support a different number of simultaneous connections and/or different capacities, and are contemplated within the spirit and scope of the present invention. These capabilities of bridge devices may be more fully exploited through the teachings of the present invention.

For instance, in projecting the impact of a configuration change, a simple approach might be to treat the bridge channel as if it were an ESCON channel, since the bridge channel can only support one I/O request per destination port, or per pseudo-channel, at one time. This means that if subsequent I/Os are started to the same destination port while one is in progress, the subsequent I/Os will all accumulate pending time, the same way that they would if they were started against an ESCON channel.

While this simple approach would work in an environment including one or more bridge attached channels, it does not fully exploit the capabilities of bridge attached channels. This is due to the fact that the projection algorithm distributes I/O bandwidth across the channels available to a subsystem. The projection algorithm distributes bandwidth by measuring the connect time that a control unit gathers during an interval (for example, a ten second interval), and then converting this to a percentage of channel utilization. So if a control unit gathered seven seconds of connect time in a ten second interval, we would view it as 70% of a channel's utilization. Since a control unit can be connected to more than one channel, a control unit could collect more than ten seconds of connect time in a ten second interval; for example, five seconds through one channel and eight through another, resulting in a view of the control unit's connect time equivalent to 130% of a single channel's utilization. However, while a control unit may be connected to multiple channels and can therefore exhibit utilization of more than 100% of a single channel, the projection algorithm of application Ser. No. 09/676,715 assumes that no single channel can exceed 100% utilization.

As previously discussed, a bridge attached channel may be capable of achieving a utilization in excess of 100%, when measured with respect to the lower capacity protocol. In particular, while the FICON bridge channel can only support one I/O request per destination port (i.e. through a single pseudo-channel) at one time, the FICON bridge channel is capable of supporting up to 8 simultaneous I/O requests to 8 different I/O ports (through 8 different pseudo-channels), and is further capable of a sustained data rate of several times that of an ESCON channel. Therefore, the FICON bridge channel may be compared to an ESCON channel that could support more than 100% utilization, since multiple I/O requests could be handled concurrently on up to eight different pseudo-channels, to 8 different destination ports. The result is that the capacity of the FICON Bridge channel is around five times that of an ESCON channel, and under certain circumstances could appear capable of supporting around 500% utilization, when measured relative to an ESCON channel.

Therefore, the methods of the present invention enable a computing environment to more fully exploit the capabilities of a bridge attached channel, such as a FICON bridge channel, by modeling the capabilities of the bridge attached channel more accurately than by simply modeling the bridge attached channel in the same manner as an ESCON channel. In particular, the constraint of 100% utilization is removed; pseudo-channels associated with the same bridge attached channel are modeled as independent channels. To better describe the solution provided by the methods of the present invention, two scenarios are provided.

Figure 13:
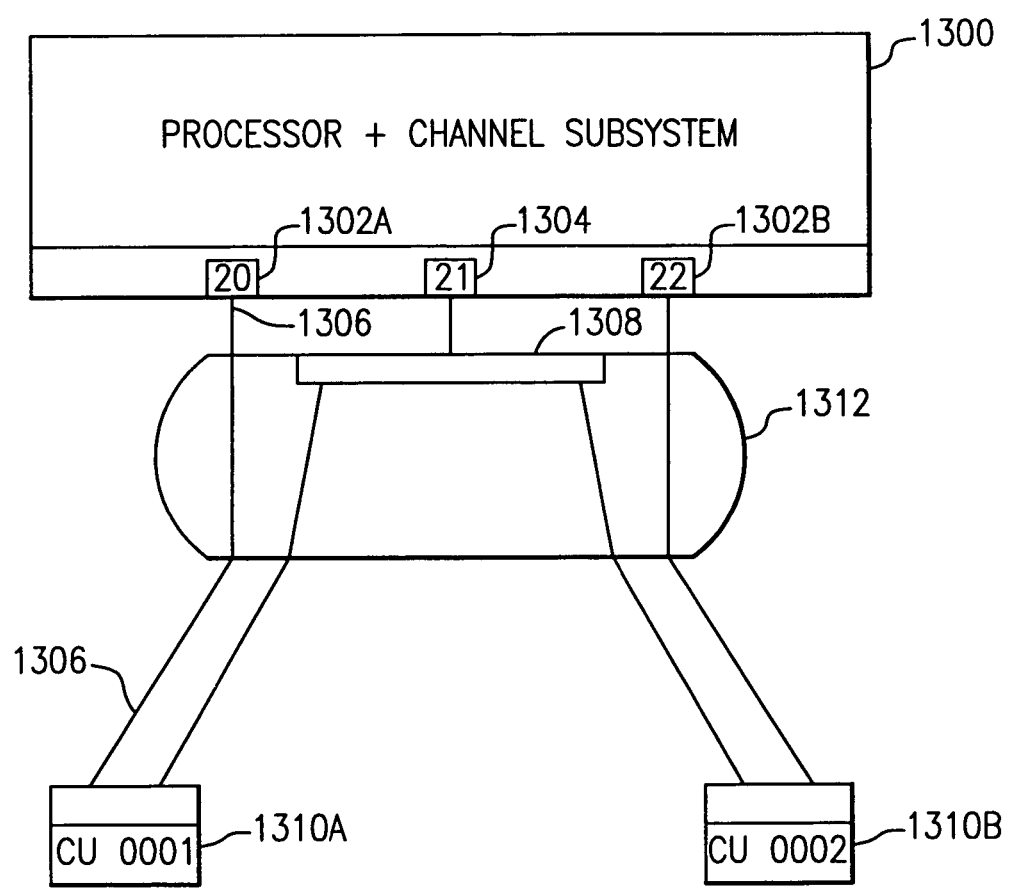
FIG. 13 depicts components of the computing environments of FIGS. 1A, 1B, and 2, illustrating advantages of the present invention.

Referring to FIG. 13, in the first scenario, processor (1300) includes two ESCON channels (1302A, 1302B) and one FICON Bridge channel, (1304). Each channel is connected to switch (1312). In particular, FICON bridge channel (1304) is connected via FICON bridge (1308), and ESCON channels (1302) are connected via ESCON links (1306). As illustrated in FIG. 13, two pseudo-channels are associated with bridge channel (1304): one providing a path to control unit 1310A, the other providing a path to control unit 1310B. There are two control units, (1310) that share the FICON Bridge channel (1304). In addition, assume that each control unit is drawing a load of 80 (i.e. 80% of a single ESCON channel). In this case we would want to apply half the load from the first control unit (1310A) to one channel (also referred to herein as CHPID, or channel path identifier) (1302A) and the other half to another CHPID (1304). When we apply the load from control unit 1310B to channels 1304 and 1302B, we would again want to apply half the load to each CHPID. Now under the old algorithm, we would say that 40% of half of the load from control unit 1310B would fail when attempting on CHPID 1304. This is because we would expect I/O requests to find the shared channel busy as a result of the load from the other control unit (i.e. 40×0.40=16), but this would not be the case when the shared channel is FICON Bridge. Since the capacity of the FICON bridge channel is so much greater than that of the ESCON links, all of the I/Os would likely proceed without accumulating pending time (assuming no Destination Port Busy).

In addition, we may be inclined to add the load of 40 (half of 80) from control unit 1310A and control unit 1310B to CHPID 1304, giving us a projected channel utilization of 80 for the FICON bridge channel, but this is not correct, the actual projected channel utilization as seen by each control unit should be closer to 40.

In summary, if the number of pseudo-channels associated with a FICON bridge channel is low, or the utilization on several such pseudo-channels is low, the system is capable of servicing the pseudo-channels as if the pseudo-channels were actually independent or autonomous ESCON channels, and the projections should be done by modeling the pseudo-channels as independent or autonomous channels. However, if control units share the same pseudo-channel, such as is the case in FIG. 2, where four logical control units (218) share the same link (212C) and therefore share the same pseudo-channel, then the projections should be done with the assumption that all four control units are sharing the same ESCON channel, as all four will be competing for the same available bandwidth on the ESCON link 212C.

Referring to FIG. 12, in the second scenario we have two ESCON channels (1202) and one FICON Bridge channel (1204). There are nine control units (1218), CU0001 through CU0009 that share the FICON Bridge channel (1204). If all of these control units have significant activity, we will no longer be able to ignore the impact to the other control units sharing the FICON Bridge channel, if we were to propose adding yet another control unit to the same channel.

Although there may be more than eight paths defined through the bridge card, it will only allow a maximum of eight open connections at a time. As a result, if I/O requests are started down more than eight paths at a time, some will see pending time.

Here, the I/O Velocity quantifies the impact of configuration changes on controllers. The quantification provides numerical representations of the impact that a particular change has on one or more controllers associated with the change. These representations can be used to select a best option for making a configuration change.

In accordance with an aspect of the present invention, the channel utilization (both ESCON and FICON bridge channels) is monitored continuously and the capacity limit of those channels in units of productive connect time as observed by the LPAR cluster is calculated on a regular basis (e.g. every ten seconds). (An LPAR cluster is, for instance, a set of partitions running on a single CPC that are all members of the same sysplex.)

Referring to FIG. 3, initially, data is collected from the systems that access the control unit, STEP 300 (FIG. 3). For example, if the computing environment is a partitioned environment, then data is collected from all of the partitions that access the control unit. In one instance, the data is collected by an I/O Supervisor (IOS) of the operating system.

The I/O Supervisor then passes the data to a workload manager (e.g., WLM), which stores the data in, for instance, a coupling facility, STEP 302. This storing of the data in the coupling facility allows the creation of a clustered LPAR-wide view of the data used to calculate the actual I/O velocity. Furthermore, in configurations including one or more bridges 216, such as a FICON bridge, the storing of data also enables the determination of average channel utilizations and the actual capacity limit of a bridge attached channel, as observed by the LPAR cluster. (An LPAR cluster is, for instance, a set of partitions running on a single CPC that are all members of the same sysplex.)

The stored data, which includes the actual control unit I/O velocity, is then capable of being used to determine whether a constraint exists for a control unit of the computing environment, STEP 304.

Figure 4A:
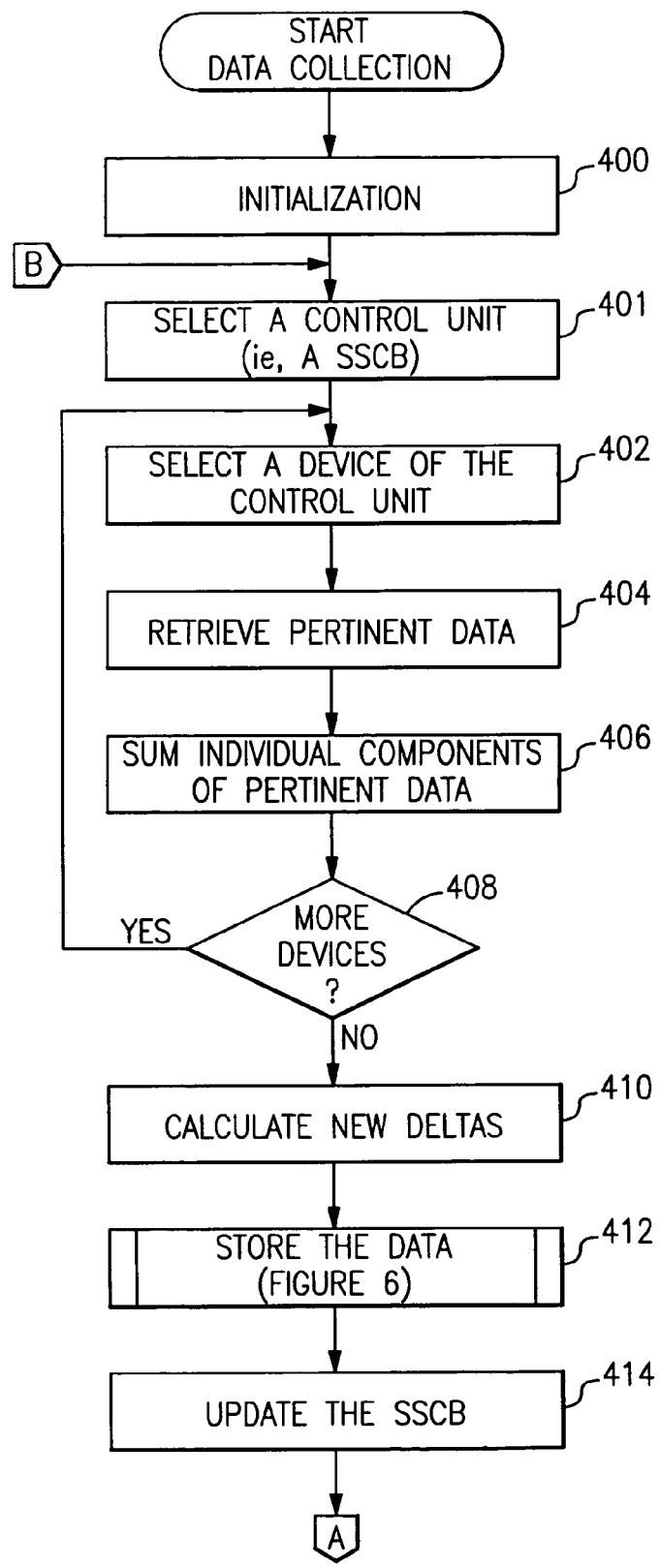
FIGS. 4A–4B depict one embodiment of the logic associated with the collection of data of FIG. 3 and with determining a default I/O velocity, in accordance with an aspect of the present invention.
Figure 4B:
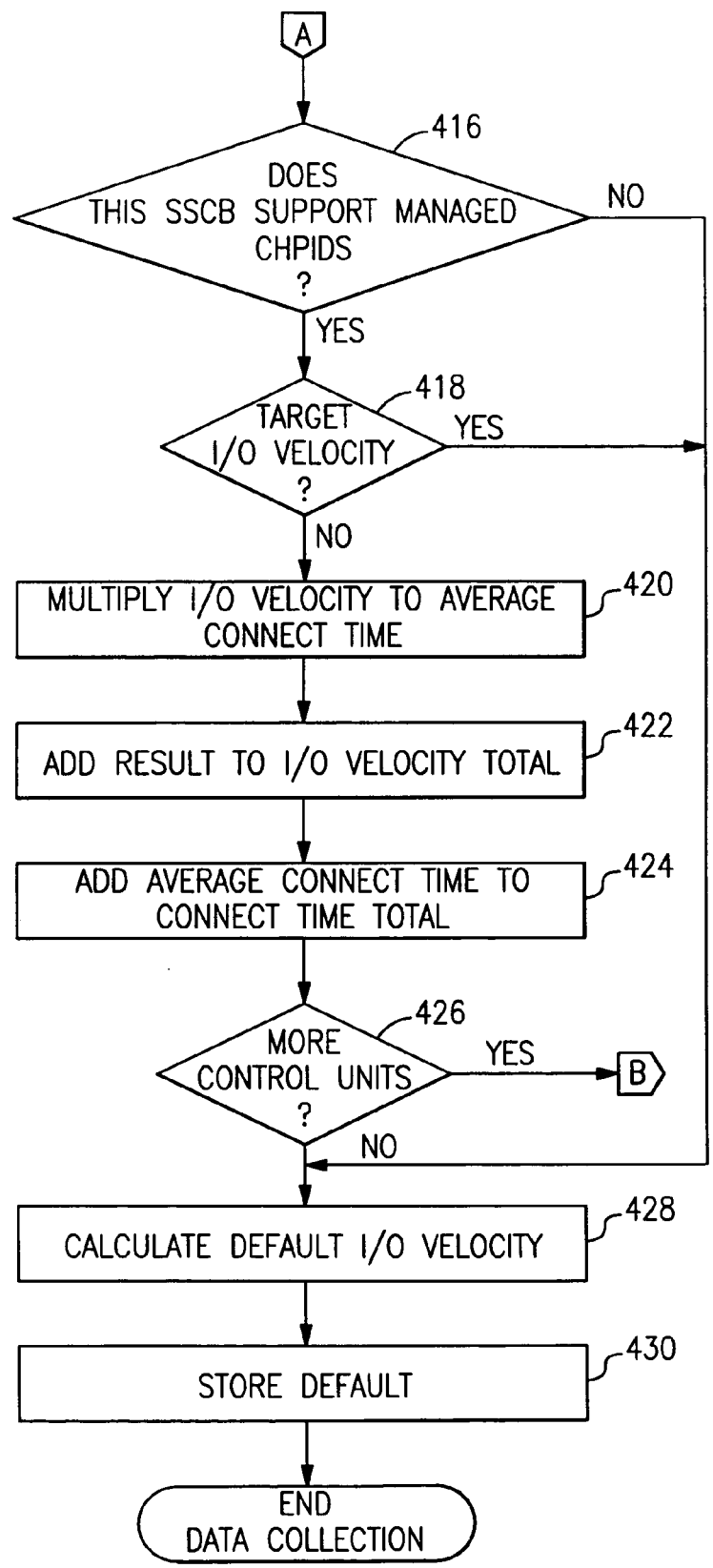

One embodiment of collecting the data is described in further detail with reference to FIGS. 4a–4b. The logic of FIGS. 4A–4B is performed by IOS, when invoked by, for instance, a workload manager at predefined intervals (e.g., every ten seconds). When the logic is invoked, some initialization is performed, STEP 400. For instance, a work area in local memory of the system running the logic is cleared, and two variables, I/O Velocity Total and Connect Time Total, are set to zero.

Thereafter, since data is collected for each device of each control unit of a cluster, a control unit is selected, STEP 401. In particular, in one instance, a subsystem control block (SSCB) representing a control unit is selected. Thus, the first subsystem control block on a chain of SSCBs is selected, which identifies the control unit for which data is being collected.

Subsequently, a device of that control unit is selected for processing, STEP 402. In one example, the list of devices for a control unit is obtained using its associated SSCB. Then, pertinent data for that device is obtained, STEP 404. For instance, the pending time and connect time are extracted from a measurement block (a.k.a., a channel measurement block (CMB)) updated by its associated channel(s). The channel measurement block keeps accumulated data of various times, including device connect time and pending time.

Additionally, the control unit busy time and device busy time are obtained via, for instance, issuing a Store Subchannel instruction (STSCH). Examples of a measurement block and a Store Subchannel instruction are described in the aforementioned z/Architecture Principles of Operation, which has been incorporated herein by reference in its entirety.

Running totals of pending time, device connect time, control unit busy time and device busy time are maintained for the devices of the current control unit, STEP 406. Thus, the pending time retrieved for the current device is added to the sum of pending times for any other devices of this control unit already processed. Likewise, the device connect time for this device is added to a total device connect time for the control unit; the control unit busy time is added to a total control unit busy; and a device busy time is added to a total device busy.

Next, a determination is made as to whether there are more devices for this SSCB, INQUIRY 408. If there are more devices, then processing continues with STEP 402, as described above. However, if there are no more devices for this SSCB, then processing proceeds with calculating new deltas, STEP 410. In particular, since each of the retrieved values represents an accumulation of values, a calculation is performed to determine how much has changed since the last calculation. For example, the last value for a particular component (e.g., device connect time, pending time, control unit busy time and device busy time) stored in the SSCB is subtracted from its corresponding new value to determine the delta.

Thereafter, the data is stored, for instance, in the coupling facility in order to provide in this example an LPAR cluster-wide view of the data, STEP 412. One example of storing the data in the coupling facility is described further below with reference to FIG. 6.

Subsequent to storing the data in the coupling facility, the SSCB is updated with the new last values, STEP 414. In particular, the last values for the device connect time, pending time, control unit busy time and device busy time are stored in the SSCB.

After updating the SSCB with the new last values, a determination is made as to whether this SSCB supports managed channel paths, INQUIRY 416 (FIG. 4B). In one example, this determination is made by checking a mask in the SSCB. If this control unit supports managed channel paths, then a further determination is made as to whether a target I/O velocity is specified in the SSCB, INQUIRY 418. If managed channel paths are supported and no target I/O velocity is specified, then this SSCB is used to calculate a default I/O velocity. In order to make this calculation, first the I/O velocity returned from the service writing the data into the coupling facility, as described below, is multiplied by an average connect time returned, STEP 420. The result of that multiplication is then added to the I/O velocity total, STEP 422. Additionally, the average connect time is added to the connect time total, STEP 424.

Subsequently, a determination is made as to whether there are more control units to be processed, INQUIRY 426. If there are more control units to be processed, then processing continues with STEP 401 (FIG. 4A) selecting a control unit. However, if there are no more control units to be processed, then the default I/O velocity to be used by all the control units that do not indicate a target I/O velocity (and support managed channels) is calculated, STEP 428. In one example, the default I/O velocity is equal to the I/O velocity total divided by the connect time total. (In the case where either no controllers had managed channels or all have an explicit target I/O velocity, then the default is set to a value, such as 100.) This default is then stored in a control block that is commonly accessible to IOS, STEP 430. In one example, this commonly accessible control block is referred to as a Dynamic CHPID Management Vector Table (DCMVT).

An alternative method to calculate the default I/O velocity is to save the highest and lowest I/O velocities associated with a managed control unit, and take their average (i.e. (H+L)/2). When doing this, certain subsystems should be excluded from the default I/O velocity calculation. For example, subsystems with have targets explicitly set by WLM should be excluded, since it is unreasonable to expect that all control units can be expected to achieve an average I/O velocity based in part upon those that WLM is explicitly trying to help. Similarly, idle control units should be excluded (i.e. those whose total connect time during an interval is below a certain amount, indicating that there is almost no activity to the control unit), since they will likely have unrealistically high I/O velocities.

In addition, a subsystem's I/O velocity will be excluded from the default target velocity calculation if it meets one or more of the following conditions: 1) it is an overachieving subsystem (its actual velocity is greater than the target velocity), it is not idle, doesn't have a target explicitly set by WLM, and has 2 or fewer online channels (reason: the subsystem is overachieving, however DCM will not reduce number of channels below 2), or 2) it is an overachieving subsystem that has no potential recipient for it's managed channels (reason: the subsystem is overachieving, however there are no subsystems capable of using the extra channels, so why remove them), or 3) WLM chose not to implement a DSB for the subsystem when called, because, for example, no proposed change is a good tradeoff, or 4) WLM would have been called to select a DSB, but two intervals have not passed since the last time WLM chose not to implement a DSB for the subsystem, or 5) it is an underachieving subsystem (its actual I/O velocity is below the target velocity) but there are either no possible ways to help it, or all possible ways are considered poor tradeoffs.

As described above, in order to provide an LPAR cluster-wide view of the data, the data is stored in the coupling facility. In one example, various components of the data are stored in a global data structure located within the coupling facility, as shown in FIGS. 5A–5C. In one example, there is one global data structure per SSCB FIGS. 5A–5B and one global data structure for all channels FIG. 5C. The global data structure contains device connect times for a plurality of intervals (e.g., twelve). This enables decisions to be based on a moving average.

Referring to FIG. 5A, a global data structure 500 includes, for instance, an index 502 used to indicate the current interval; a control unit I/O velocity field 504 for storing the calculated actual control unit I/O velocity; a plurality of connect times 506, one for each of the plurality of intervals (e.g., intervals 1–12); an average of connect time intervals field 508, which indicates an average of eleven of the twelve intervals; a plurality of pending times 510, one for each of the plurality of intervals; an average of pending time intervals field 512 that includes an average of eleven of the twelve pending time intervals; and a plurality of control unit plus device busy times 514, one for each interval; and an average of CU+device busy intervals field 516, which indicates an average of eleven of the twelve CU+device busy intervals.

Referring to FIG 5B; the contents of the global data structure 500 also includes, a plurality of pseudo channel connect times 520, one for each of the plurality of intervals (e.g., intervals 1–4), for each of a plurality of paths (e.g. indices 1–8); an average of pseudo channel connect time intervals field 522, one for each of the plurality of paths, which indicates an average of three of the four intervals.

Referring to FIG. 5C; a global data structure 550, one for all of the channels (e.g. 1–256), includes a plurality of channel connect times 556, one for each of a plurality of intervals (e.g., intervals 1–4), for each of the channels; an average of three of the four channel connect times 558, one for each channel; a plurality of channel busy percentages 560, one for each of the plurality of intervals, for each of the channels; an average of channel busy percentage intervals field 562 that includes an average of three of the four channel busy percentage intervals, one for each channel.

One embodiment of the logic associated with storing data in the coupling facility is described with reference to FIG. 6. Initially, a time stamp is obtained, STEP 600. The time from the time stamp is then converted to tens of seconds, STEP 602. Thereafter, an index is calculated by taking modulo 4 of the time in tens, STEP 604.

Subsequently, the global data structure of the coupling facility is read into local memory and the index that was just calculated is compared to the index stored in the global data structure, STEP 606. If the calculated index is equal to the stored index indicating that a new interval is now being started, INQUIRY 608, then the pertinent data for the channel connect times is added to the global data structure and the pertinent data for channel busy percentage replaces the data in the global data structure, STEP 610. In particular, the connect time, the pending time, the control unit busy time, the device busy time, the pseudo channel connect time, and the channel connect time for each channel are added to the values already stored at those fields in the appropriate interval.

However, if the calculated index is not equal to the stored index, this indicates that a new interval is being started. Thus, certain information is calculated for the current interval that recently ended. For example, an average connect time is calculated using 11 of the 12 intervals (the new interval, which may not have yet received data from all partitions in the cluster, is left out), STEP 612, and that average is stored at average of intervals field 508. Similarly, an average of pending time is calculated using 11 of the 12 intervals, and that average is stored at average of pending time intervals 512; and an average of CU+busy time is calculated and stored in field 516. Furthermore, an average of pseudo channel connect time is calculated for each path (index) using 3 of the 4 intervals (the new interval is left out), and the average is stored at the corresponding average of pseudo channel connect time intervals field 522. An average channel connect time is calculated for each channel using 3 of the 4 intervals (the new interval is left out), and that average is stored at the corresponding average of intervals field 558. Similarly, an average of channel busy percentage is also calculated for each channel using 3 of the 4 intervals, and that average is stored at the corresponding average of channel busy percentage intervals field 562.

Additionally, a new control unit I/O velocity is calculated and stored at field 504, STEP 614. In particular, the actual I/O velocity is determined by using the control unit I/O velocity equation described above. In that equation, ΣDevice Connect Times is set equal to the average of intervals 508, ΣPending Times is set to average of pending time intervals 512, and ΣCU Busy Times and Device Busy Times is set to average of CU and device busy intervals 516.

Further, the new index that was calculated at STEP 604 is now stored at fields 502 and 552, STEP 616. Additionally, the new data (e.g., the connect time, the control unit and device busy times, the pending time, the pseudo channel connect times, the channel connect times and channel busy percentage points) are stored in their respective fields for the new interval, STEP 618.

Thereafter, a version number associated with the data structure is incremented, and a writing of the data structure to the coupling facility from local memory is initiated, STEP 620. During this initiation, if the version number check fails, INQUIRY 622, then processing continues with STEP 606 and the data structure is not written to the coupling facility. Otherwise, the global data structure is written to the coupling facility. Further, the average channel connect time for each channel and the average channel busy percentage points for each channel are returned to the caller.

At this point, an actual control unit I/O velocity has been determined for each of the desired control units. Each control unit I/O velocity provides a metric of channel delay, which may be used to set channel bandwidth consumption targets for individual control units. In one example, the target for a control unit is the default calculated above or an explicit target specified by WLM. Further, in another embodiment, a fixed value may be used.

There are two types of channels, static and managed. A managed channel is one that may be defined to, or removed from a control unit, dynamically by the methods described in Ser. No. 09/407,544 which has been incorporated herein by reference; and a static channel is one which may not be dynamically defined to or removed. If a FICON bridge channel is a static channel, then it may be in use by partitions other than those that are members of the LPAR cluster doing this analysis. In that case, we will be able to determine the overall utilization of the real FICON bridge channel, but we will be unable to determine the pseudo-channel utilization, which requires us to know the connect time associated with the pseudo-channel (520). Since these other partitions are not contributing their connect time to that in the coupling facility structure (500), we may find that the real FICON bridge channel reaches its capacity long before we would expect, based on the connect time that we are spreading. For example, if normally we could spread a load of 50 seconds of connect time in a ten second interval to the FICON bridge channel before it was at it's maximum capacity, but one or more partitions outside the LPAR cluster were already contributing 20 seconds of connect time in the same ten second interval, we would need to know that we could only spread thirty seconds before we reached its maximum capacity. To address this, an actual channel connect time per channel for the LPAR cluster and average (overall) channel busy percentage per channel has been determined for each of the channels and returned to the caller, in particular for the FICON bridge channels. If it is determined that a FICON bridge channel is at it's capacity limit (i.e. the average channel busy percentage is greater than or equal to a value that indicates that the channel is near its capacity, in one example 97%) the channel connect time for that channel represents the maximum capacity of that channel that can be used productively to transfer data, and this number is stored in a local instance of the channel path connect table (CPCT) which represents measured performance data values for all the channels (of the logical partition) indexed by their channel ID. For FICON bridge channels this time is also referred to as FICON bridge channel connect time threshold, that is, the maximum amount of connect time that could be spread before we reach the real FICON bridge channel's maximum capacity.

This works as long as the other partitions only maintain or increase their usage of the shared static channel. We also want to know when they have reduced their usage of the channel. For this the CPCT structure includes, for instance, a counter for each channel which is incremented whenever it is determined that an associated FICON Bridge channel is not at it's capacity limit and is set to zero whenever it is determined that an associated FICON Bridge channel is at it's capacity limit as described above. Whenever one of these counters reaches a predefined limit, which represents a certain amount of time (e.g. sixty intervals) the channel connect time representing the maximum capacity of that channel in the CPCT is incremented by a predefined amount representing an additional amount of channel capacity or utilization (e.g. 10 percent of the current maximum capacity for that channel). In this way, after increasing the threshold, we will either hit the threshold again, and reset it; or if other partitions not in our LPAR cluster have reduced their utilization, we will gradually increase our threshold until we find the new one.

A balance checking service may then be invoked by the workload manager at predetermined intervals (e.g., every ten seconds) (or the logic of FIGS. 4A–4B automatically flow into the balance checking service) to determine if any of the channel connected control units are not achieving their target I/O velocity. In particular, if any of the control units are found outside of a tolerance of, for instance, plus or minus 5 percentage points of the target I/O velocity, an imbalance correction function is executed in an attempt to place the control unit within range. One embodiment of an imbalance correction technique is described in detail in Cwiakala et al., Ser. No. 09/407,544, entitled "Method, System and Program Products For Managing I/O Configurations Of A Computing Environment," filed Sep. 28, 1999, which is hereby incorporated herein by reference in its entirety.

In the imbalance correction technique, each control unit failing to meet the target, referred to herein as the target control unit, has associated therewith one or more decision selection blocks (DSBs), each of which represents a different possible solution (e.g., a different configuration). Further, each DSB includes a list of one or more control units that would be affected by the change represented by that DSB.

For the target control unit and each affected control unit of a DSB (collectively referred to herein as affected control units), a projected adjusted I/O velocity technique is invoked, in accordance with an aspect of the present invention, in order to determine a projected adjusted I/O velocity for each of the affected control units of the DSB should the configuration be adopted. The projected I/O velocities resulting from the invocation of the routine are stored in the DSB. This information is then used to select the best option for the target control unit within the tolerance of the target I/O velocity.

Figure 7:
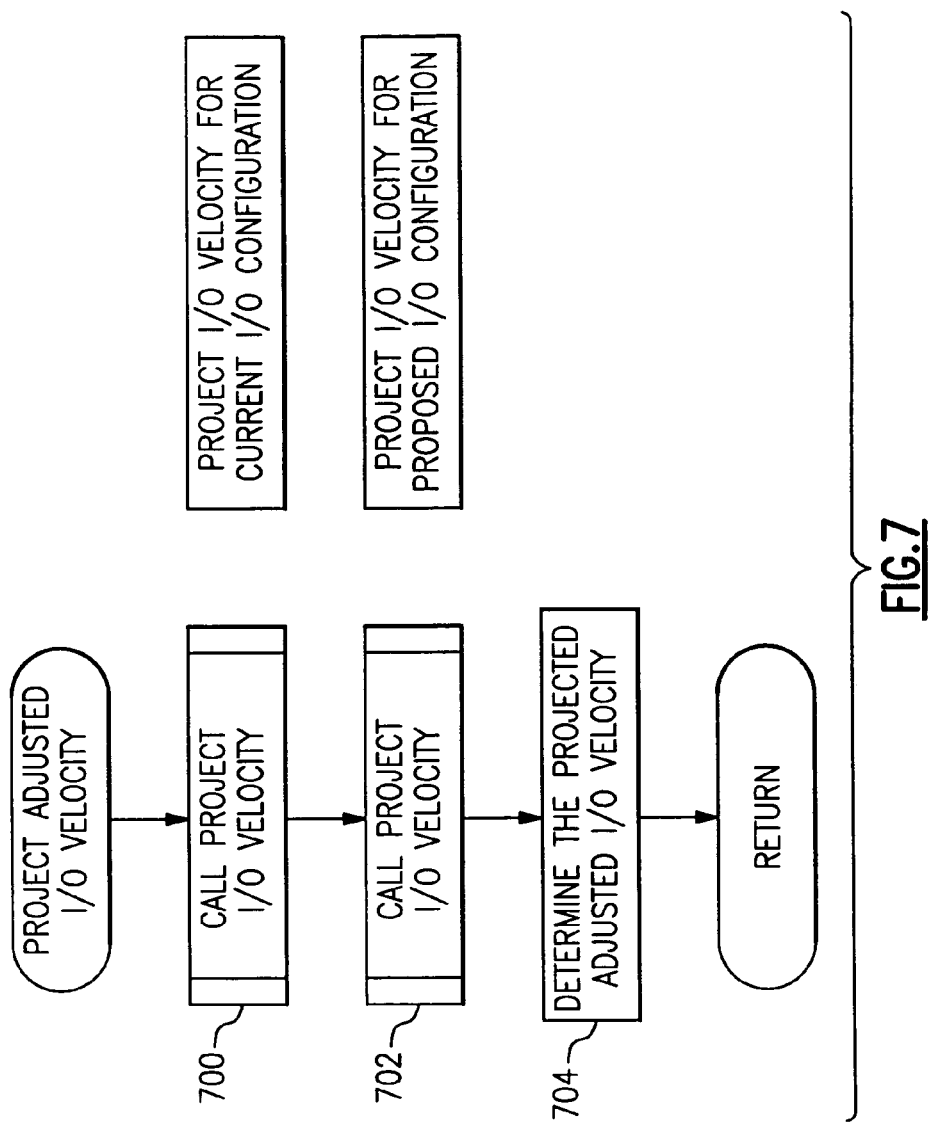
FIG. 7 depicts one embodiment of the logic associated with projecting an adjusted I/O velocity, in accordance with an aspect of the present invention.

One embodiment of the logic associated with projecting adjusted I/O velocities for affected control units of a DSB is described with reference to FIG. 7. Initially, a project I/O velocity routine (described below) is invoked in order to project the I/O velocity for the control units based on the current I/O configuration, STEP 700. That is, the project I/O velocity routine is executed for the current configuration in order to obtain one or more a base numbers (i.e., one or more base I/O velocities) to be used later on for comparison. Subsequent to projecting the I/O velocity for the current I/O configuration, the project I/O velocity routine is invoked for the control units, once again. This time it is executed for a proposed I/O configuration associated with the DSB, STEP 702. Thereafter, a projected adjusted I/O velocity for each control unit of the DSB is determined using the projected I/O velocity values obtained from the two executions of project I/O velocity, STEP 704. In one example, the projected adjusted I/O velocity for a particular control unit is obtained by calculating the delta of the two values (i.e., the project I/O velocity of the proposed configuration–the project I/O velocity of the current configuration) and adding the delta to the actual I/O velocity of the current configuration previously determined for the control unit. This value is placed in the DSB corresponding to the control unit.

One example of the details associated with projecting I/O velocities for affected control units is described with reference to FIG. 8. Initially, the utilization of the channels associated with a configuration (initially for the current configuration and later for the proposed configuration of the target control unit) are projected, STEP 800. To project the channel utilizations for the configuration, the corresponding I/O topology is looked at and the adjusted control unit load on the affected control units, described below, is used.

In one embodiment, the project channel utilization logic processes control units with the least number of channels first. In case of multiple control units with the same number of channels, those control units with the least load (i.e., total connect time) are processed first. However, the logic has no order dependency on processing the channels.

Further details regarding the projecting of channel utilizations is described with reference to FIG. 9. In the description of this logic, a "." notation is used, which indicates a value for a particular component specified after the ".". For instance, failed load.CU indicates there is a failed load value for each control unit of interest.

Figure 9:
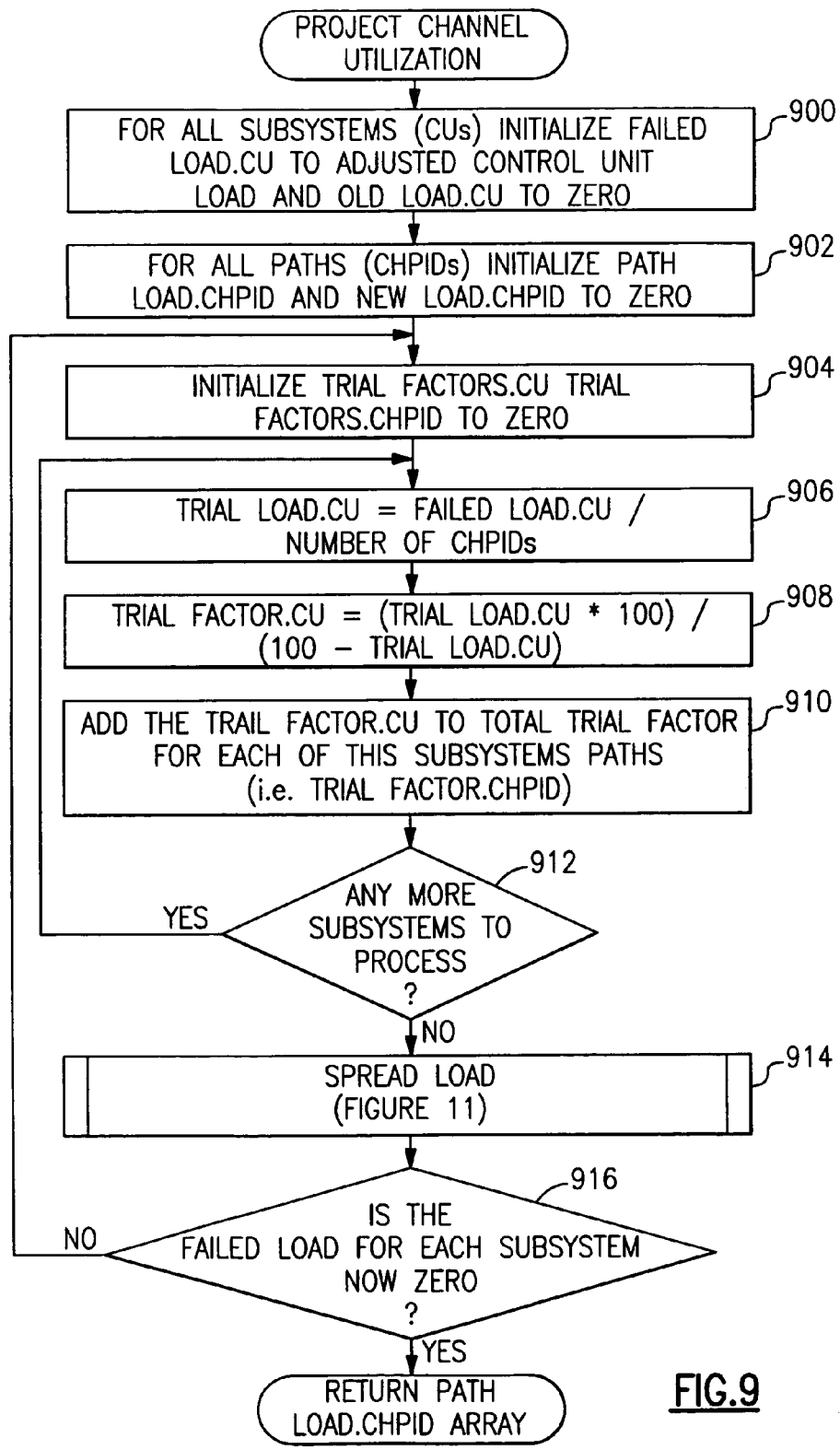
FIG. 9 depicts one embodiment of the logic associated with the project channel utilization of FIG. 8, in accordance with an aspect of the present invention.

Referring to FIG. 9, initially, for each control unit affected by the configuration, a variable referred to as old load.CU is initialized to zero, and another variable referred to as failed load.CU is initialized to an adjusted control unit load, STEP 900. In order to determine an adjusted control unit load, the logic of FIG. 10 is employed.

Figure 10B:
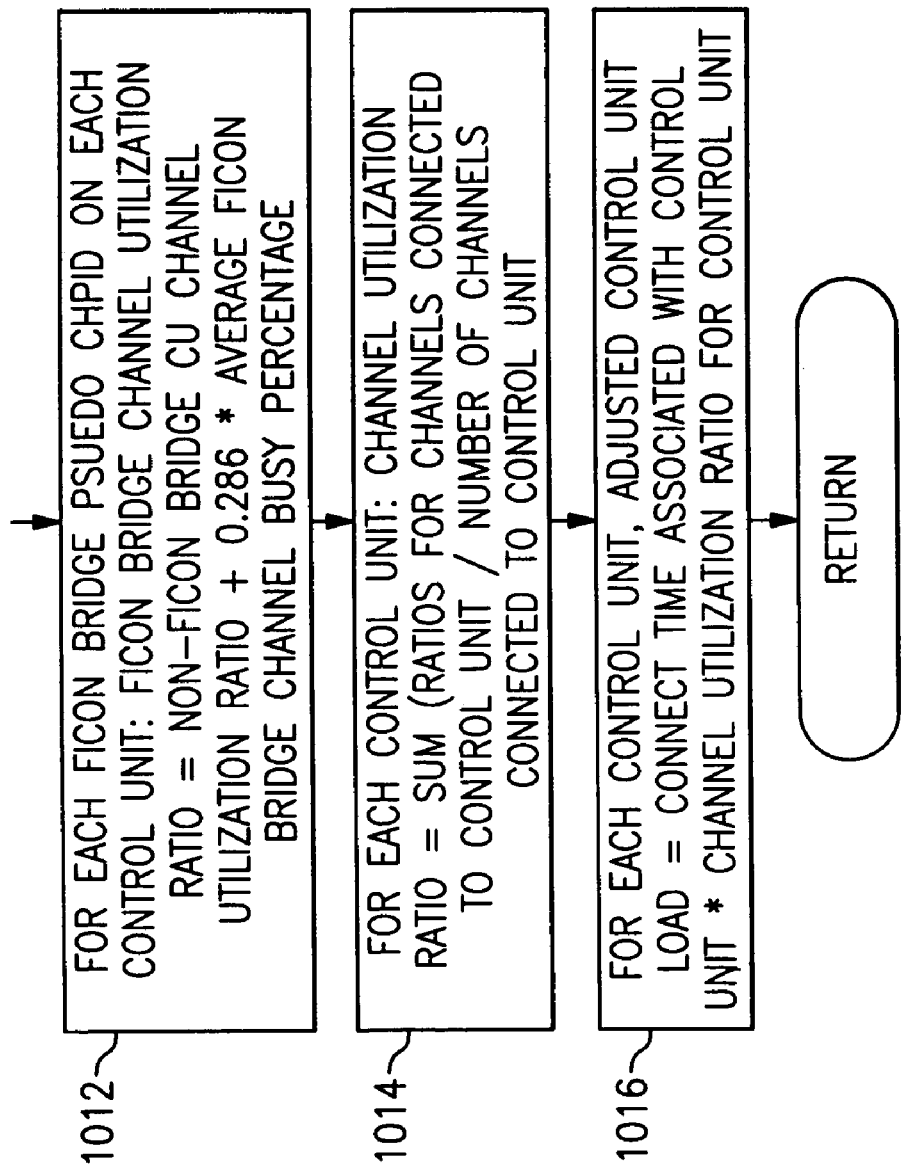
FIG. 10 depicts one embodiment of the logic associated with calculating adjusted control unit loads, in accordance with an aspect of the present invention.

Referring to FIG. 10, at predefined intervals, one or more counts are taken, which are used during the calculations. In order to obtain a desired count for a particular interval, a timestamp associated with the interval is determined. For example, a channel time delta is set equal to a channel update time, which is retrieved from a facility (e.g., a Channel Path Measurement Facility (CPMF)), minus the last channel update time, which is stored in memory, STEP 1000. This provides a timestamp for the last interval. For this interval, a channel busy time delta is set equal to a channel busy time (retrieved from CPMF) minus the last channel busy time, STEP 1002. (One example of CPMF is described in Glassen et al., Ser. No. 09/539,024, entitled "Measuring Utilization Of Individual Components Of Channels", filed Mar. 30, 2000, which is hereby incorporated herein by reference in its entirety.)

Additionally, a channel connect update time delta [STEP 1004] is set equal to the channel connect update time minus the last channel connect update time to obtain an interval for channel connect time. Then, a channel connect time delta [STEP 1006] is set equal to a channel connect time minus the last channel connect time, which provides an amount of connect time associated with the data transfer that occurred in the last interval. (In one example, the connect time is being accumulated in a table (e.g., a Channel Path Connect Table CPCT, where it is accumulated I/O by I/O from the CMB), and the timestamp is associated therewith.)

The connect time associated with a control unit is used to estimate the load on a control unit, and the connect time is then used to estimate the utilization of channels serving the control unit. However, connect time is not the only factor contributing to channel utilization. For example, if one were to measure seven seconds of connect time in a ten second interval for a control unit connected to a single, unshared channel, one might expect that the channel is 70% utilized. The channel may, however, actually have higher utilization, possibly 85%. Since the other factors influencing utilization are difficult to measure, a reasonable approach is to estimate the factors using a busy-to-connect (B2C) ratio. The B2C ratio for a channel is determined by measuring the connect time during an interval associated with a channel, converting it into a percentage connected, and then obtaining the channel utilization. The B2C ratio is then calculated as (percent busy/percent connected), or 85/75 in our example. This results in a ratio which can then be used to adjust the connect time associated with a control unit, taking into account various factors which are difficult to measure. When connect time (or load) is subsequently spread across the channels that are serving the control unit, a more accurate estimate is obtained. When a control unit is being served by two or more channels, we use the average B2C ratios of those channels. The B2C ratio is alternatively referred to as a channel ratio.

A channel ratio is determined by dividing the channel busy time delta by the channel connect time delta, STEP 1008. Using the above calculations, a channel ratio is determined for each channel of each control unit of the current DSB that is not a bridge attached channel.

Subsequently, for each FICON Bridge channel connected to a control unit, a non-FICON Bridge channel utilization ratio is determined, STEP 1010. In one example, the channel utilization ratio is determined by adding the ratios for the non-FICON Bridge channels connected to the control unit to obtain a sum, and dividing the sum by the number of channels connected to the control unit. This number is then used to calculate a channel ratio for each FICON Bridge channel connected to the control unit to accurately reflect the performance characteristics of the channel. The FICON Bridge channel is treated as multiple pseudo channels (one pseudo channel for each director destination port where it is connected FIG. 12). The FICON bridge pseudo channel utilization ratio for each pseudo channel is determined STEP 1012 by using the non-FICON bridge channel utilization ratio and adding the product of a constant, representing an amount by which a typical FICON bridge B2C ratio exceeds a typical ESCON channel B2C ratio (in one example 0.286) and the FICON Bridge average busy utilization percentage stored in the CPCT (FICON Bridge channel utilization ratio=non-FICON Bridge channel utilization ratio+ 0.286*average FICON Bridge channel busy percentage). In the case where no non-FICON Bridge channel utilization ratio exists (e.g. because only FICON Bridge channels are connected to the control unit) a constant, representing a typical channel utilization (or B2C) ratio for such channels, is used for the non-FICON Bridge channel utilization ratio. In one example, this ratio is 85/70 (1.214).

Subsequently, for each control unit, a control unit's channel utilization ratio is determined, STEP 1014. In one example, the control unit channel utilization ratio is determined by adding the ratios for the non-FICON Bridge channels connected to the control unit and the FICON Bridge channels connected to the control unit to obtain a sum, and dividing the sum by the number of channels connected to the control unit.

Additionally, for each control unit, an adjusted control unit load is determined, STEP 1016. In one example, the adjusted control unit load is equal to the average connect time associated with the control unit (i.e., a sum of the 11 intervals of connect times for the control unit divided by 11) multiplied by the channel utilization ratio for the control unit. This provides the adjusted control unit loads employed by the project channel utilization routine.

Returning to FIG. 9, subsequent to initializing the failed load.CU to the adjusted control unit load for all the affected control units of this configuration, processing continues with initializing a variable referred to as path load.CHPID to zero for all paths (e.g., channels and pseudo-channels), STEP 902.

In the case of a FICON Bridge channel a pseudo CHPID (and also a load.CHPID for each pseudo CHPID) is used for each director destination port where the FICON Bridge channel is connected. Moreover, variables referred to as trial factors.CU, trial factors.CHPID and FCVLoad.FCVChannel are initialized to zero for all of the control units and channels, respectively, of all of the affected control units, STEP 904.

Next, a control unit is selected to be processed, and for that control unit, a variable referred to as trial load.CU is set equal to the failed (or unassigned) load.CU/number of channel paths for that control unit, STEP 906. Further, the trial factor for the control unit is determined, STEP 908. In one example, trial factors.CU is set equal to (trial load.CU× 100)/(100−trial load.CU). Thereafter, trial factors.CU is added to the total trial factor for each of the subsystem's paths (i.e., trial factors.CHPID), STEP 910.

Figure 11:
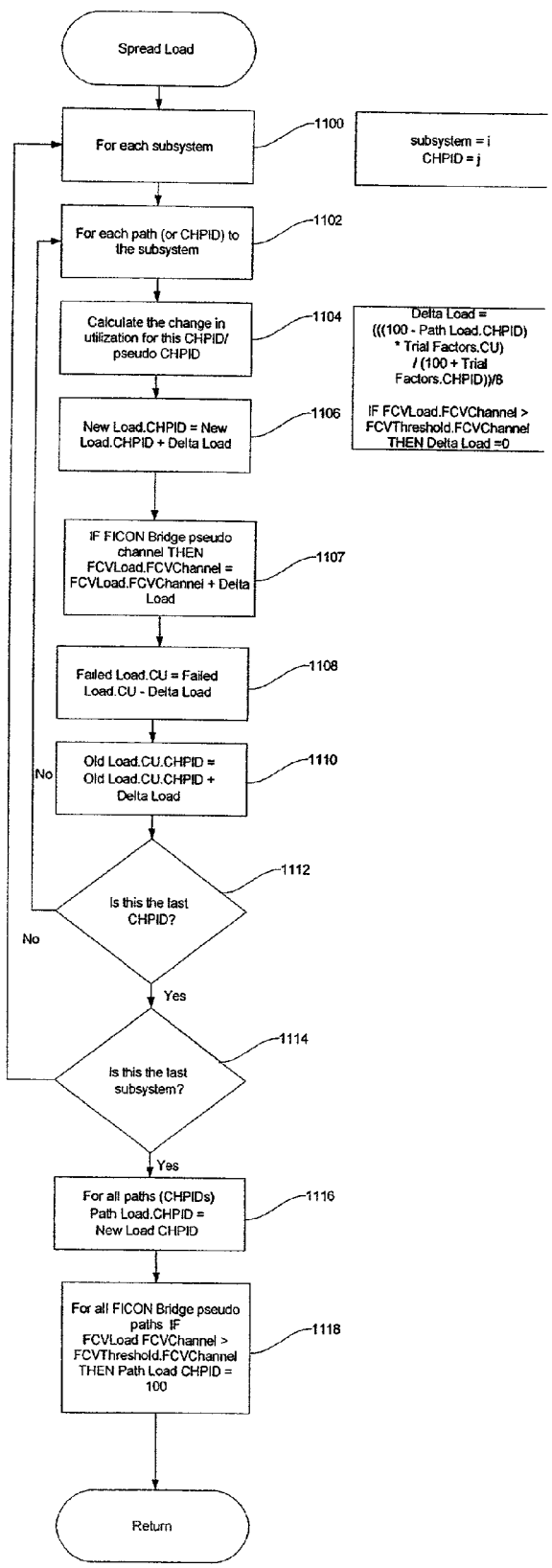
FIG. 11 depicts one embodiment of the logic associated with spreading the load, in accordance with an aspect of the present invention.

Subsequently, a determination is made as to whether there are any more control units to process, INQUIRY 912. If there are more control units to process, then processing continues with STEP 906. However, if there are no more control units to process, then a spread load function is invoked, STEP 914. One embodiment of the logic associated with the spread load function is described below with reference to FIG. 11.

The spread load logic is performed for each control unit of the DSB and for each path within the control unit. Thus, initially the control unit is selected, STEP 1100, and a path within the control unit is selected, STEP 1102.

For the selected path within the control unit, the change in utilization for this CHPID is calculated, STEP 1104. One example of this calculation is as follows: Delta Load=((100− path load.CHPID)×trial factors.CU)/(100+trial factors.CHPID)/8, in which the values of the variables are obtained from the project channel utilization logic. If a CHPID in this calculation is a FICON Bridge pseudo CHPID, a non-zero FCVLoad.FCVChannel has been obtained as described above and the FCVLoad.FCVChannel is greater than the FICON Bridge load threshold for the FICON Bridge channel associated with the FICON Bridge pseudo CHPID then Delta Load is set to zero.

Thereafter, the new load for the path is calculated by adding the delta load to the new load.CHPID (i.e., new load.CHPID=new load.CHPID+delta load), STEP 1106. Further, the failed load and old load for the control unit are calculated, respectively. For instance, failed load.CU=failed load.CU−delta load, STEP 1108, and old load.CU.CHPID=old load.CU.CHPID+delta load, STEP 1110.

For every FICON Bridge pseudo CHPID the associated FCVLoad.FCVChannel is calculated [STEP 1107], for instance FCVLoad.FCVChannel=FCVLoad.FCVChannel+ load.CHPID.

Subsequently, a determination is made as to whether this is the last CHPID attached to this control unit, INQUIRY 1112. If this is not the last CHPID, then processing continues with STEP 1102. However, if this is the last CHPID of the selected control unit, then a determination is made as to whether this is the last control unit in this DSB, INQUIRY 1114. If this is not the last control unit, then processing continues with STEP 1100. However, if this is the last path of the last control unit, then for each path (i.e., CHPID), its respective path load.CHPID is set equal to the new load- .CHPID, STEP 1116. Referring back to FIG. 9, after performing the spread load, a determination is made as to whether the failed load for each control unit of the DSB is minimal (e.g., within 0.5%, or approaching zero), INQUIRY 916. If the failed load for each control unit is not minimal, then processing continues with STEP 904. Otherwise, processing of the project channel utilization is complete, STEP 918. The path load.CHPID represents the projected channel utilization for the corresponding path.

For each load.CHPID, if the load.CHPID represents the projected utilization for a FICON Bridge pseudo CHPID, a non-zero associated FCVLoad.FCVChannel has been obtained as described above and the FCVLoad.FCVChannel is greater than the FICON Bridge load threshold for the FICON Bridge channel associated with the FICON Bridge pseudo CHPID then the load.CHPID for this FICON Bridge pseudo channel is set to 100 (100%) [STEP 1118].

Figure 8:
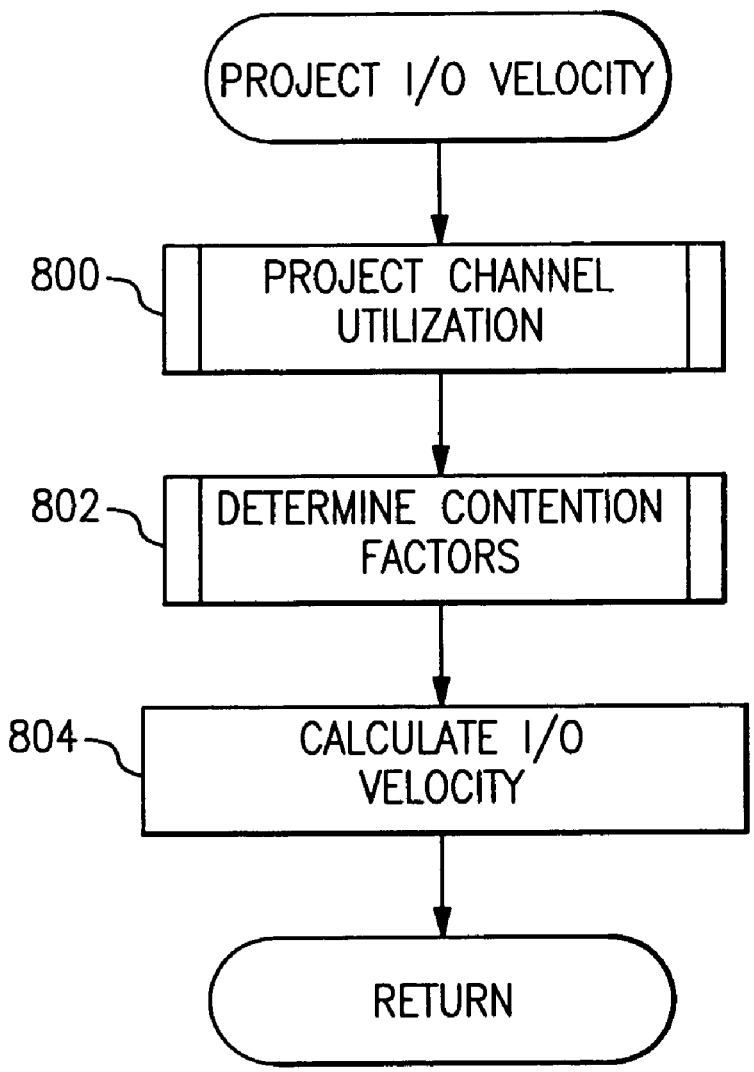
FIG. 8 depicts one embodiment of the logic associated with the project I/O velocity invocation of FIG. 7, in accordance with an aspect of the present invention.

After completing the project channel utilizations, processing continues with determining contention factors, STEP 802 (FIG. 8). In one example, a contention factor is defined as: Given a control unit with N channels at a given utilization, the contention factor for the control unit is the single channel equivalent utilization yielding an equal probability that an I/O request to that control unit would wait. The contention factors are determined using the projected channel utilizations and the configuration (either the current or proposed configuration).

A contention factor is determined for each control unit in the DSB, one at a time. For example, assume that a Control Unit 220 is connected to 4 CHPIDs having the following projected utilizations. Assume also that three of these channels are ESCON channels, and the fourth, CHPID 20, is a FICON bridge channel connected to control unit 220 through port 16. In the example below, the convention CHPID.port is used to identify a pseudo-channel which includes channel "CHPID," and the switch port to which the control unit is connected designated "port." This convention provides the ability to distinguish different pseudo-channels associated with the same bridge attached channel.

| CHPID | UTILIZATION |
|---|---|
| 20.16 | 40% |
| 37 | 42% |
| 48 | 29% |
| 73 | 33% |

In one example, the CHPIDs connected to the control unit are sorted from lowest to highest projected utilization:

| CHPID | UTILIZATION |
|---|---|
| 48 | 29% |
| 73 | 33% |
| 20.16 | 40% |
| 37 | 42% |

Then, average utilizations are calculated based on the utilization of the first CHPID in the list, then the average of the first two CHPIDs in the list, and so on down the list.

| CHPID | UTILIZATION | AVERAGE UTILIZATION |
|---|---|---|
| 48 | 29% | 29% |
| 73 | 33% | 31% |
| 20.16 | 40% | 34% |
| 37 | 42% | 36% |

Each of the average utilizations is then applied to a table to determine its corresponding contention factor. If the exact utilization is not in the table, then an interpolation is performed. One example of the table is depicted below:

Single CHPID Equivalent Utilization Yielding Equal Probability of Waiting (Contention Factor)

| Avg. Util. | Number of CHPIDs | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 5 | 5 | 0 | 0 | 0 | 0 | 0 | 0 | 0 |
| 10 | 10 | 2 | 0 | 0 | 0 | 0 | 0 | 0 |
| 15 | 15 | 4 | 1 | 0 | 0 | 0 | 0 | 0 |
| 20 | 20 | 7 | 2 | 1 | 0 | 0 | 0 | 0 |
| 25 | 25 | 10 | 4 | 2 | 1 | 0 | 0 | 0 |
| 30 | 30 | 14 | 7 | 4 | 2 | 1 | 1 | 0 |
| 35 | 35 | 18 | 10 | 6 | 4 | 2 | 1 | 1 |
| 40 | 40 | 23 | 14 | 9 | 6 | 4 | 3 | 2 |
| 45 | 45 | 28 | 19 | 13 | 9 | 7 | 5 | 3 |
| 50 | 50 | 33 | 24 | 17 | 13 | 10 | 8 | 6 |
| 55 | 55 | 39 | 29 | 23 | 18 | 14 | 12 | 9 |
| 60 | 60 | 45 | 35 | 29 | 24 | 20 | 17 | 14 |
| 65 | 65 | 51 | 42 | 35 | 30 | 26 | 23 | 20 |
| 70 | 70 | 58 | 49 | 43 | 38 | 34 | 30 | 27 |
| 75 | 75 | 64 | 57 | 51 | 46 | 42 | 39 | 36 |
| 80 | 80 | 71 | 65 | 60 | 55 | 52 | 49 | 46 |
| 85 | 85 | 78 | 73 | 69 | 65 | 62 | 60 | 57 |
| 90 | 90 | 85 | 82 | 79 | 76 | 74 | 72 | 70 |
| 95 | 95 | 93 | 91 | 89 | 88 | 87 | 85 | 84 |
| 100 | 100 | 100 | 100 | 100 | 100 | 100 | 100 | 100 |

The result of the table lookup is:

| CHPID | UTILIZATION | AVERAGE UTILIZATION | CONTENTION FACTOR |
|---|---|---|---|
| 48 | 29% | 29% | 29.0% |
| 73 | 33% | 31% | 14.8% |
| 20.16 | 40% | 34% | 9.4% |
| 37 | 42% | 36% | 6.6% |

The above is repeated for all of the affected control units, yielding contention factors for each control unit of the DSB.

Referring to FIG. 8, after determining the contention factors for the affected control units of the DSB, the contention factors are converted into projected I/O velocities [STEP 804] using, for instance, a table per control unit built and managed by a workload manager. The table begins with at least two points: one having an I/O velocity of zero and a contention factor of 100, and another having an I/O velocity of 100 and a contention factor of zero; and it is a running record of control units, and associated actual contention factors and I/O velocities the workload manager has seen in the past. To keep this running record, WLM measures the current I/O velocity and contention factor of each control unit. It then stores the measured I/O velocity in the table entry which represents the contention factor measured. In one embodiment, the table has 50 entries. Each entry in the table represents a contention factor range of 2. The first entry represents contention factors of 0 to 1, the second entry 2 to 3, and so on. If the entry for the current contention factor is empty, WLM stores the measured I/O velocity in the entry. If the entry is not empty, WLM stores a value which is equal to (3*current value+the new I/O velocity)/4. After saving the new I/O velocity, WLM verifies that the rest of the table is consistent with the new I/O velocity. All I/O velocities for higher contention factors should be lower, and I/O velocities for low contention factors should be higher. WLM clears any table entries that are inconsistent with the new I/O velocity.

Thus a contention factor is looked up in the table to see historically the result (projected I/O velocity). If the exact value is not in the table, then an interpolation is performed.

So, for the example above, assume the following is determined:

| CHPID | UTILIZATION | AVERAGE UTILIZATION | CONTENTION FACTOR | I/O VELOCITY |
|---|---|---|---|---|
| 48 | 29% | 29% | 29.0% | 72 |
| 73 | 33% | 31% | 14.8% | 78 |
| 20.16 | 40% | 34% | 9.4% | 83 |
| 37 | 42% | 36% | 6.6% | 95 |

In one embodiment, the I/O velocity associated with the lowest contention factor is selected to represent the control unit. Thus, in the above example, the lowest contention factor for Control Unit 220, e.g., 6.6, is used as a contention factor for the control unit. Therefore, the I/O velocity for this control unit is 95. The above is repeated for all of the control units of the DSB, and then these projected I/O velocities are returned to project adjusted I/O velocity in FIG. 7 to determine the projected adjusted I/O velocities for the control units of the DSB.

In one example, only the I/O velocity of the lowest contention factor of a control unit needs to be calculated. The others are shown for example purposes.

When determining the contention factor for a control unit attached to one or more FICON Bridge channels the associated FICON Bridge pseudo channel utilization multiplied by the FICON Bridge channel utilization ratio is used in the calculation of the contention factor. If a FICON Bridge channel's busy percentage is greater or equal to a constant describing it's capacity limit (e.g. 97%) all associated FICON Bridge pseudo utilization's are considered to be 100%.

After determining the contention factors for all the control units of the DSB, the contention factors are converted into projected I/O velocities using, for instance, a table per control unit built and managed by a workload manager. The table begins with at least two points: one having an I/O velocity of zero and a contention factor of 100, and another having an I/O velocity of 100 and a contention factor of zero; and it is a running record of control units, and associated actual contention factors and I/O velocities the workload manager has seen in the past. To keep this running record, WLM measures the current I/O velocity and contention factor of each control unit.

It then stores the measured I/O velocity in the table entry which represents the contention factor measured. In one embodiment, the table has 50 entries. Each entry in the table represents a contention factor range of 2. The first entry represents contention factors of 0 to 1, the second entry 2 to 3, and so on. If the entry for the current contention factor is empty, WLM stores the measured I/O velocity in the entry. If the entry is not empty, WLM stores a value which is equal to (3*current value+the new I/O velocity)/4. After saving the new I/O velocity, WLM verifies that the rest of the table is consistent with the new I/O velocity. All I/O velocities for higher contention factors should be lower, and I/O velocities for low contention factors should be higher. WLM clears any table entries that are inconsistent with the new I/O velocity.

When projecting channel utilizations for a FICON Bridge Channel, the individual pseudo-channels are treated as separate ESCON channels. However, the algorithm will assure that the total amount of connect time associated with the real FICON bridge channel does not exceed the threshold for the real channel [see FIG. 11, steps 1104 and 1120]. By doing this, the effect of enough control units whose collective load is great enough to create an effect on each other is factored into the channel utilization projection.

Another method of factoring in the effect of other control units is would be to examine the load as calculated for both the real FICON bridge channel as well as the pseduo-channels during each iteration of the loop within the algorithm. So for example, in FIG. 11, step 1104 would be modified so that it calculates the delta load the current way for ESCON channels, but it is a FICON bridge channel we would use the maximum of the "path load" associated with the real channel and the individual pseudo-channel as the "Path Load.CHPID". In addition, we would use the maximum of the trial factors for the real and the individual pseudo-channel as the "Trial Factor.CHPID".

Currently we only calculate the "Path Load.CHPID" and "Trial Factor.CHPID" at the real channel level, so we would need to calculate additional values for both at the pseudo-channel level as well. To do this we would need to modify step 1106 in FIG. 11 so that it performs its current processing for ESCON channels, but if it is a FICON Bridge channel, the a "New Load" associated with the pseudo-channel (e.g. "New Load.CHPID.port") would be calculated, by adding the Delta Load to the current "New Load" for that pseudo-channel. Then, the "New Load" associated with the real channel would be calculated by adding the delta load divided by the threshold for this FICON bridge channel to the "New Load" associated with the real channel. The reason that we need to do the division is to adjust for the fact that the FICON bridge channel can accumulate over ten seconds of connect time in a ten second interval, so we want to divide by the maximum amount—the threshold—so that we view the real channel as becoming 100% utilized as it approaches the threshold, not ten seconds of connect time.

Next, after step 1118, for FICON bridge channels, the "Path Load" associated with the pseudo-channel must be updated with the current value of the "New Load" associated with the pseudo-channel. The "Trial Factor" associated with the pseudo-channel would be calculated by adding a step in FIG. 9, after step 910, which adds the "Trial Factor.CU" to the total trial factor for each of this subsystems pseudo-channels (e.g. "Trial Factor.CHPID.port"). Lastly, in FIG. 9, steps 902 and 904 would have to be modified to initialize the new "path load", "new load", and trial load variables to zero.

Described in detail above is a capability for projecting I/O velocities for affected controllers of I/O configuration changes in configurations with FICON Bridge and possibly ESCON channels. The projected I/O velocities can be used to determine the best option to be employed to move a controller within its target I/O velocity range.

Described in detail above is a capability for projecting the impact of a configuration change on one or more controllers involving FICON Bridge and possibly ESCON Channels. Although in the embodiment above, the project I/O velocity routine is invoked twice for a DSB, once for the current configuration and once for a proposed configuration, this is only one example. In another example, the routine is only invoked for the proposed configuration. In that example, there may also be no need for determining the projected adjusted I/O velocity. The projected I/O velocity may suffice.

In the embodiments described above, various computing environments and systems are described. These are only examples and are not intended to limit the various aspects of the present invention. Further, various aspects of the present invention are described with reference to logical partitions. The use of logical partitions is only one example. Aspects of the invention will apply to other types of partitioning, as well as to non-partitioned systems. Thus, these are also considered within the scope of the present invention.

In one example, for non-partitioned systems, storage within a global repository (such as within a coupling facility) is not necessary.

Although an embodiment of the invention is described in terms of a control unit and channels, in particular FICON Bridge channels, the invention is not limited to such components. Aspects of the invention are equally applicable to other controllers and resources in other environments, such as storage area networks and other networks. For instance, in further embodiments, the methods described can be used with other channel types that are bridged to channel types with different performance and bandwidth characteristics to predict changes in performance as a result of configuration changes. Also in further embodiments, the controller is a processor which is communicating with (or transferring data with) another processor (e.g., using channel-to-channel communications); or the controller is a single device (e.g., an I/O device), which has no intelligent control unit between it and a processor. Further, aspects of the invention are equally applicable to environments in which the logic (e.g., for determining whether a constraint exists for a controller) is executed by a controller communicating directly with (or transferring data directly with) the other controller.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of projecting an impact of configuration changes on controllers in a computing environment having at least one bridge attached channel, said method comprising:
    associating a plurality of pseudo-channels with said at least one bridge attached channel,
    selecting a first controller associated with a configuration change,
    projecting an impact of the configuration change on said first controller, wherein said projecting includes:
        modeling said plurality of pseudo-channels as a plurality of independent channels, and
        quantifying the impact.

2. The method of claim 1, wherein said modeling comprises designating a second controller as affected by said configuration change if said first controller and said second controller share a common pseudo-channel.

3. The method of claim 2, wherein said first controller and said second controller comprise logical controllers within a single physical controller.

4. The method of claim 1, wherein said modeling comprises designating a second controller as unaffected by said configuration change if said first controller and said second controller utilize different pseudo-channels associated with the same bridge attached channel.

5. The method of claim 1, wherein said projecting comprises determining a projected I/O velocity of said controller, said projected I/O velocity quantifying the impact.

6. The method of claim 5, wherein said determining comprises:
    projecting utilization of one or more channels of said controller to obtain one or more channel utilizations;
    determining one or more contention factors for said controller, said determining employing said one or more channel utilizations; and
    obtaining said projected i/o velocity using at least one contention factor of said one or more contention factors.

7. The method of claim 6, wherein said one or more channels includes at least one pseudo-channel.

8. The method of claim 7, wherein said projecting utilization of one or more channels comprises:
    iteratively adjusting projected load on the one or more channels until a projected unassigned load associated with said controller is at a predefined level; and
    determining projected utilization of the one or more channels, in response to the iteratively adjusting.

9. A method of projecting an impact of configuration changes on controllers in a computing environment having at least one bridge attached channel, said method comprising:
    associating a plurality of pseudo-channels with said at least one bridge attached channel,
    determining a utilization metric of said bridge attached channel,
    selecting a first controller associated with a configuration change,
    projecting an impact of the configuration change on said first controller, wherein said projecting includes:
        modeling said plurality of pseudo-channels as a plurality of independent channels if said utilization metric is below a threshold, and
        quantifying the impact.

10. The method of claim 9, wherein said utilization metric is channel utilization.

11. The method of claim 10, wherein said threshold is a fixed percent.

12. The method of claim 10, wherein said threshold is pseudo-channel utilization.

13. A system of projecting an impact of configuration changes on controllers in a computing environment having at least one bridge attached channel, said system comprising:
    means for associating a plurality of pseudo-channels with said at least one bridge attached channel,
    means for selecting a first controller associated with a configuration change,
    means for projecting an impact of the configuration change on said first controller, wherein said means for projecting includes:
        means for modeling said plurality of pseudo-channels as a plurality of independent channels, and
        means for quantifying the impact.

14. The system of claim 13, wherein said means for modeling comprises means for designating a second controller as affected by said configuration change if said first controller and said second controller share a common pseudo-channel.

15. The system of claim 14, wherein said first controller and said second controller comprise logical controllers within a single physical controller.

16. The system of claim 13, wherein said means for modeling comprises means for designating a second controller as unaffected by said configuration change if said first controller and said second controller utilize different pseudo-channels associated with the same bridge attached channel.

17. The system of claim 13, wherein said at least one bridge attached channel is a FICON bridge channel.

18. The system of claim 17, further comprising at least one ESCON channel.

19. The system of claim 17, further comprising at least one dynamic switch.

20. A system of projecting an impact of configuration changes on controllers in a computing environment having at least one bridge attached channel, said system comprising:
    means for associating a plurality of pseudo-channels with said at least one bridge attached channel,
    means for determining a utilization metric of said bridge attached channel,
    means for selecting a first controller associated with a configuration change,
    means for projecting an impact of the configuration change on said first controller, wherein said projecting includes:
        means for modeling said plurality of pseudo-channels as a plurality of independent channels if said utilization metric is below a threshold, and
        means for quantifying the impact.

21. The system of claim 20, wherein said utilization metric is channel utilization.

22. The method of claim 21, wherein said threshold is a fixed percent.

23. The method of claim 21, wherein said threshold is pseudo-channel utilization.

24. At least one program storage device readable by a machine, tangibly embodying at least one program of instructions executable by the machine to perform a method of projecting an impact of configuration changes on controllers in a computing environment having at least one bridge attached channel, said method comprising:
   associating a plurality of pseudo-channels with said at least one bridge attached channel,
   selecting a first controller associated with a configuration change,
   projecting an impact of the configuration change on said first controller, wherein said projecting includes:
      modeling said plurality of pseudo-channels as a plurality of independent channels, and
      quantifying the impact.

25. The at least one program storage device of claim 24, wherein said modeling comprises designating a second controller as affected by said configuration change if said first controller and said second controller share a common pseudo-channel.

26. The at least one program storage device of claim 25, wherein said first controller and said second controller comprise logical controllers within a single physical controller.

27. The at least one program storage device of claim 24, wherein said modeling comprises designating a second controller as unaffected by said configuration change if said first controller and said second controller utilize different pseudo-channels associated with the same bridge attached channel.

28. At least one program storage device readable by a machine, tangibly embodying at least one program of instructions executable by the machine to perform a method of projecting an impact of configuration changes on controllers in a computing environment having at least one bridge attached channel, said method comprising:
   associating a plurality of pseudo-channels with said at least one bridge attached channel,
   determining a utilization metric of said bridge attached channel,
   selecting a first controller associated with a configuration change,
   projecting an impact of the configuration change on said first controller, wherein said projecting includes:
      modeling said plurality of pseudo-channels as a plurality of independent channels if said utilization metric is below a threshold, and
      quantifying the impact.

29. The at least one program storage device of claim 28, wherein said utilization metric is channel utilization.

30. The at least one program storage device of claim 29, wherein said threshold is a fixed percent.

31. The at least one program storage device of claim 29, wherein said threshold is pseudo-channel utilization.

* * * * *